May 1, 1928.  1,668,073

F. S. HEBDEN

AUTOMATIC WEIGHING AND RECORDING MECHANISM

Filed April 2, 1926  13 Sheets-Sheet 1

INVENTOR
Frank S. Hebden
John C. Seifert
HIS ATTORNEY

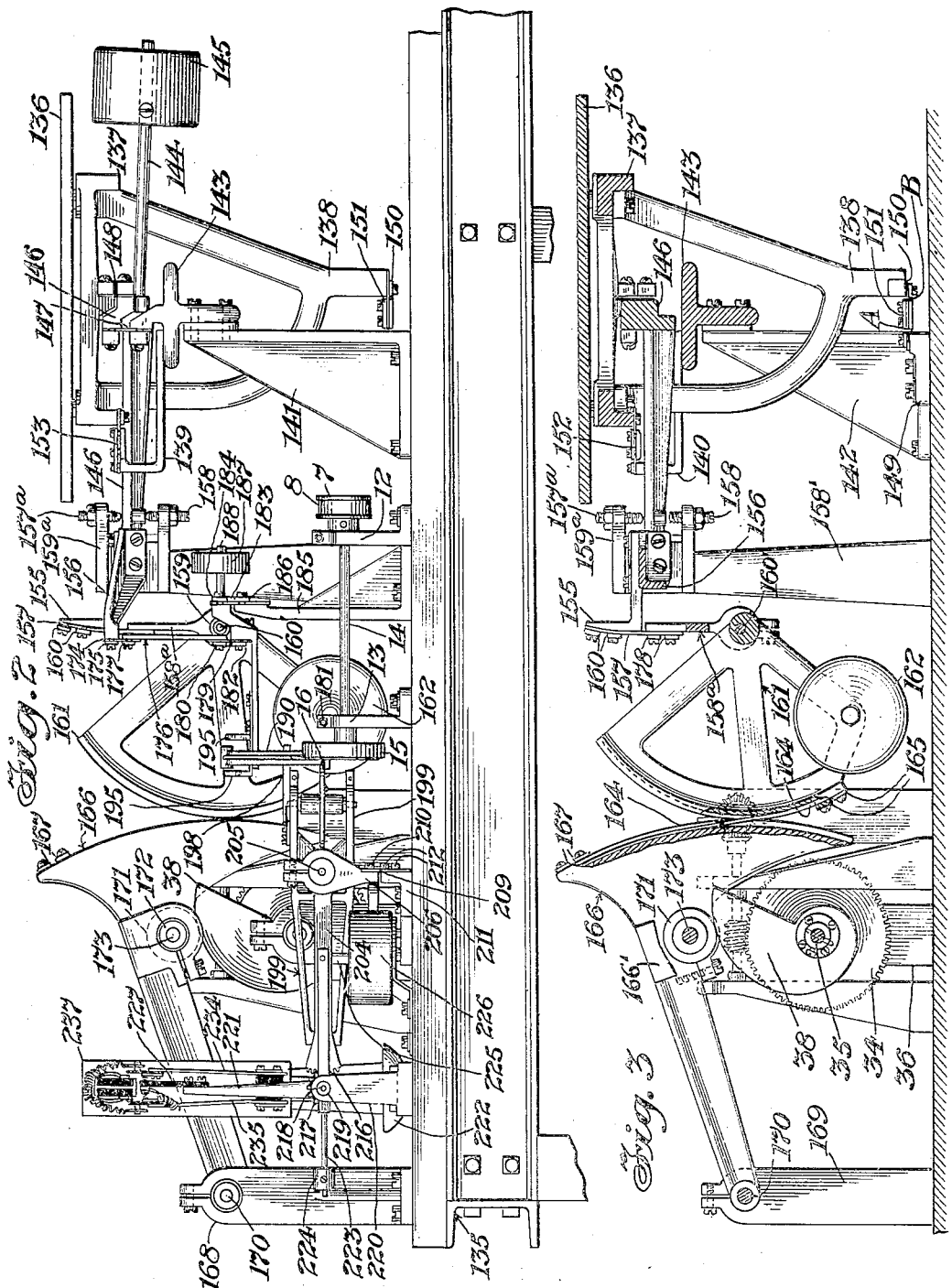

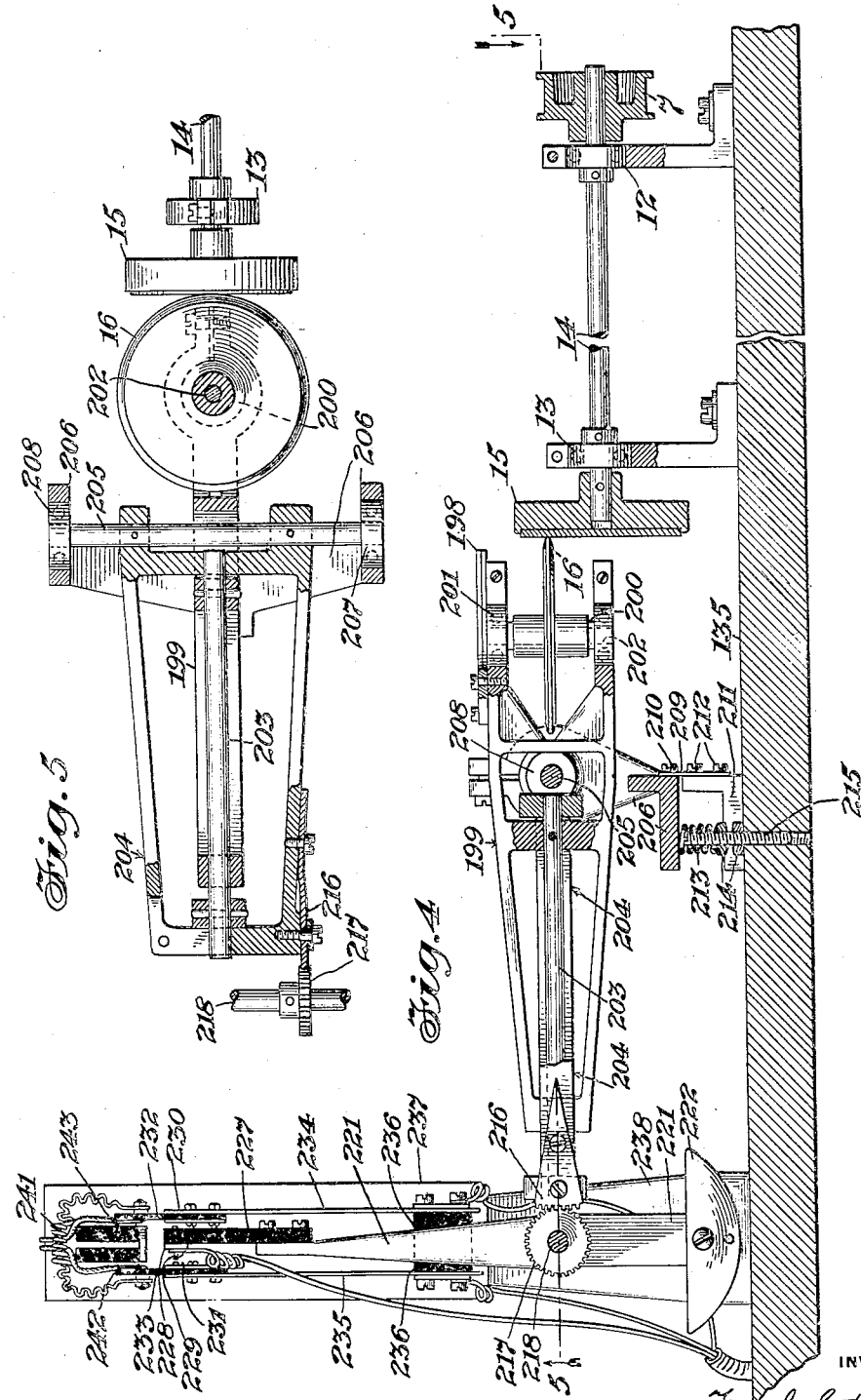

May 1, 1928. 1,668,073
F. S. HEBDEN
AUTOMATIC WEIGHING AND RECORDING MECHANISM
Filed April 2, 1926 13 Sheets-Sheet 4
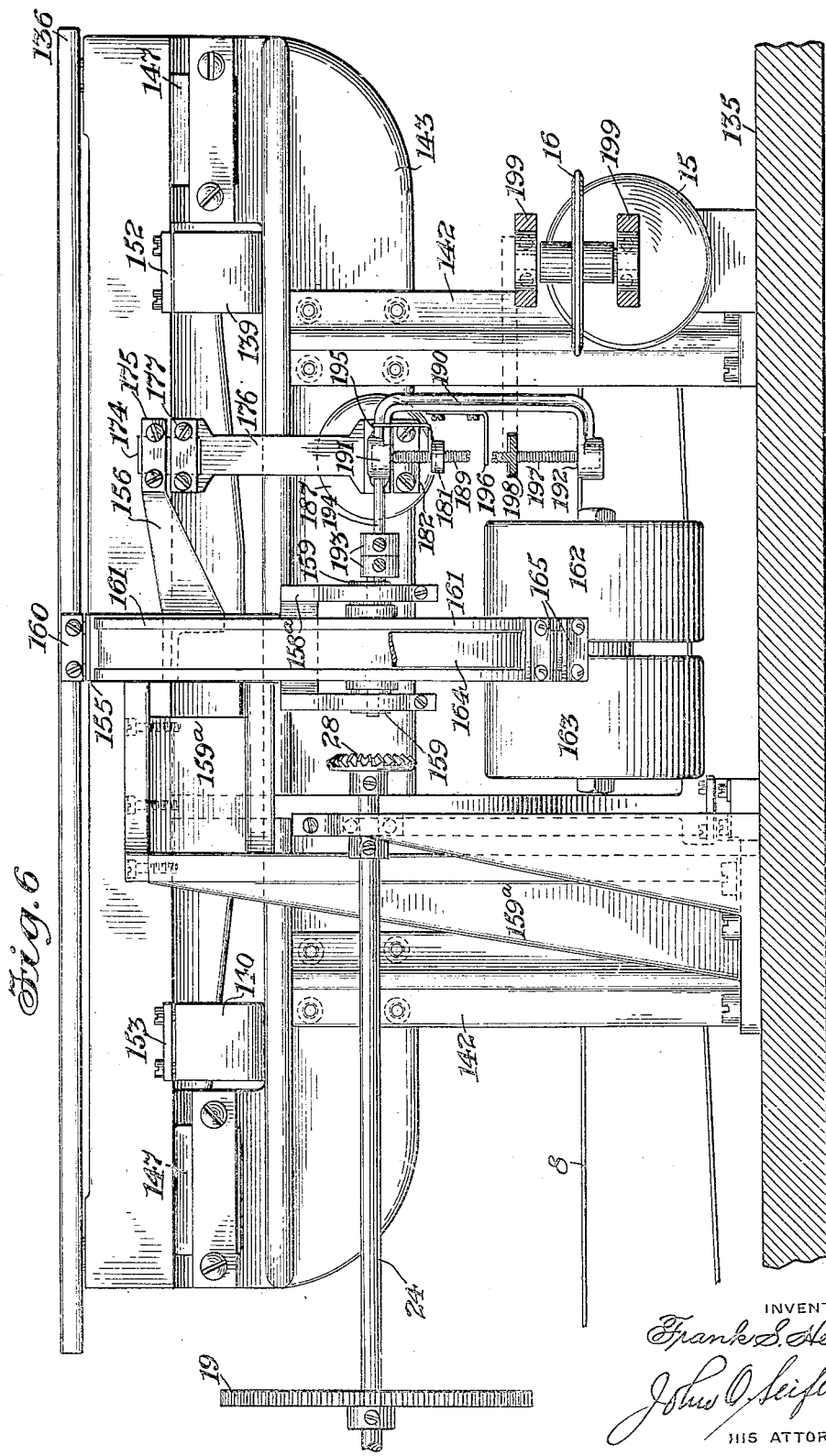
INVENTOR
Frank S. Hebden
John O. Seifert
HIS ATTORNEY

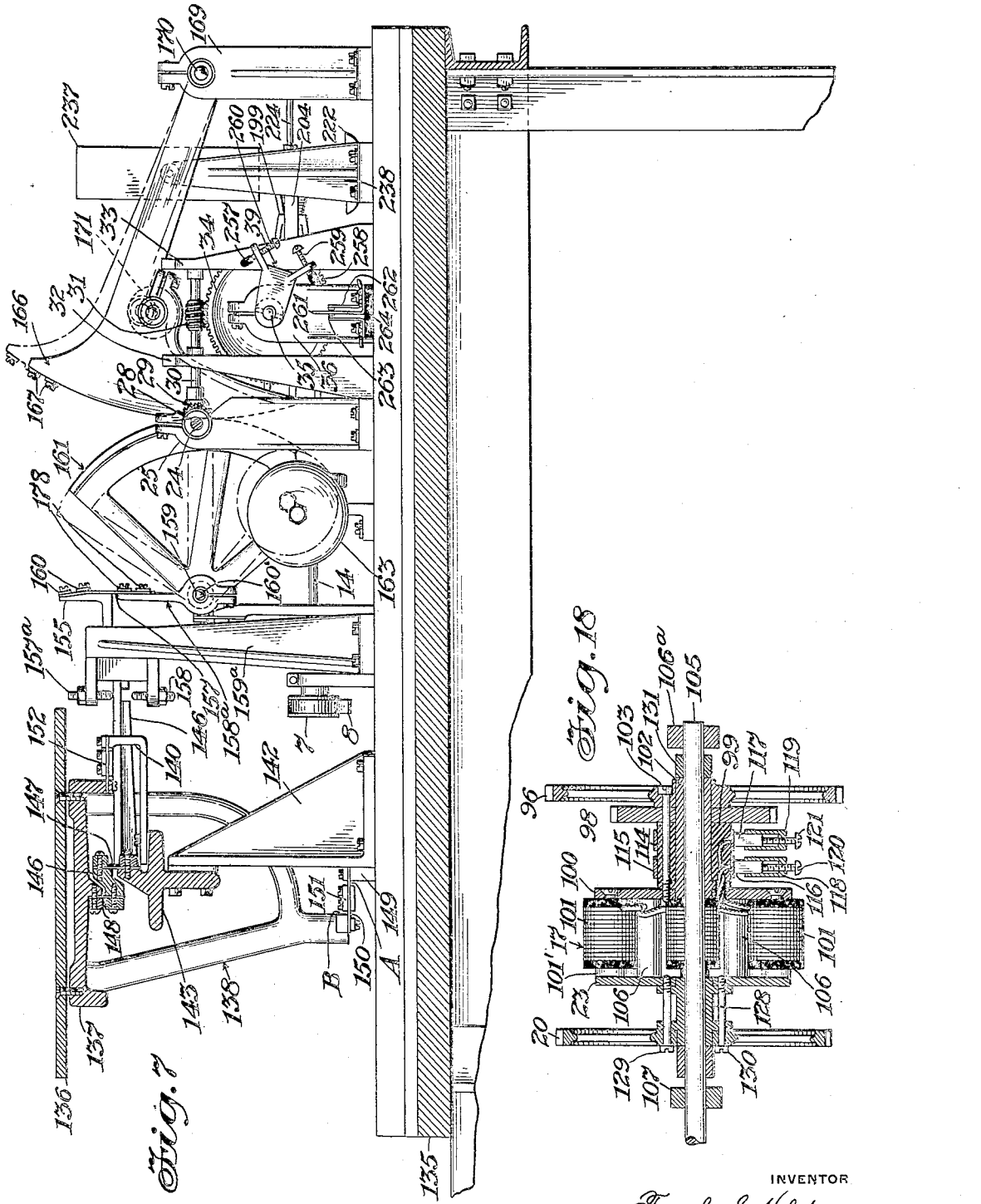

May 1, 1928.  
F. S. HEBDEN  
1,668,073  
AUTOMATIC WEIGHING AND RECORDING MECHANISM  
Filed April 2, 1926 13 Sheets-Sheet 6
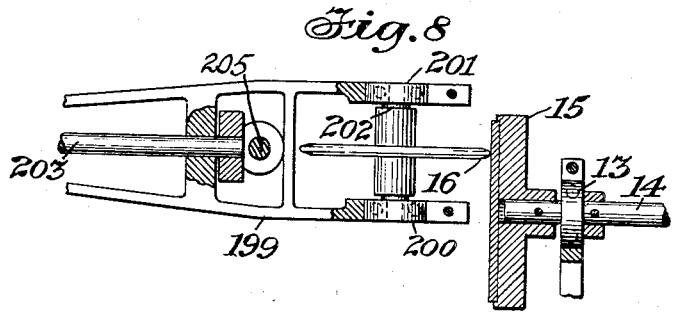
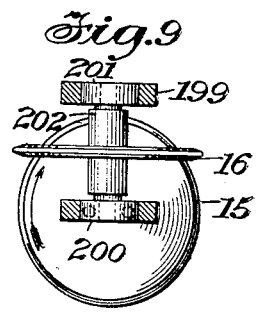
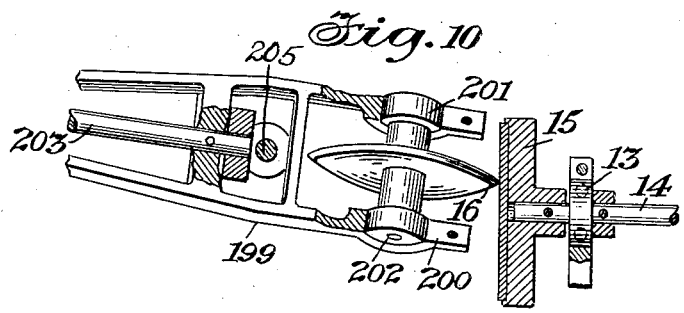
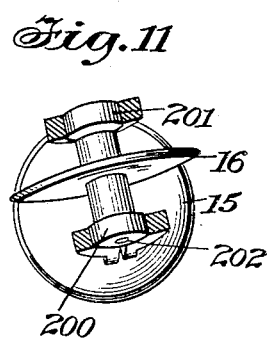
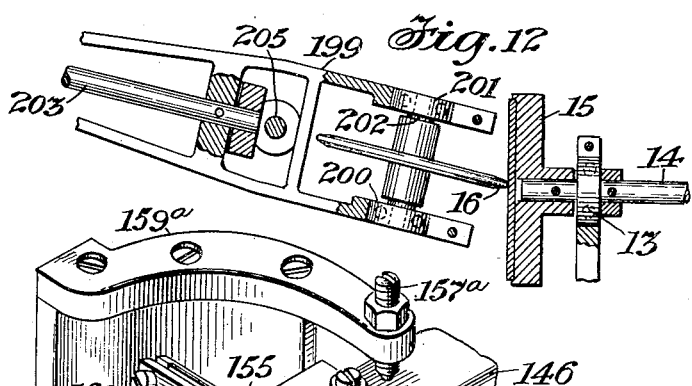
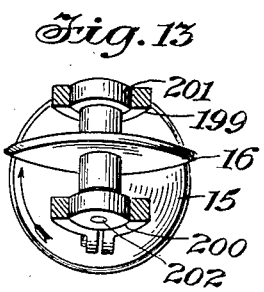
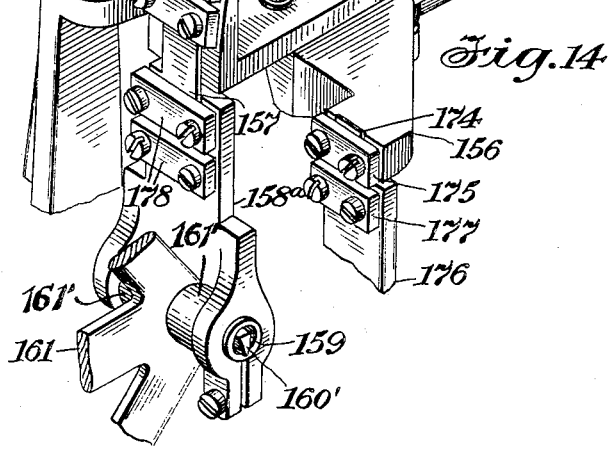
INVENTOR  
Frank S. Hebden  
HIS ATTORNEY

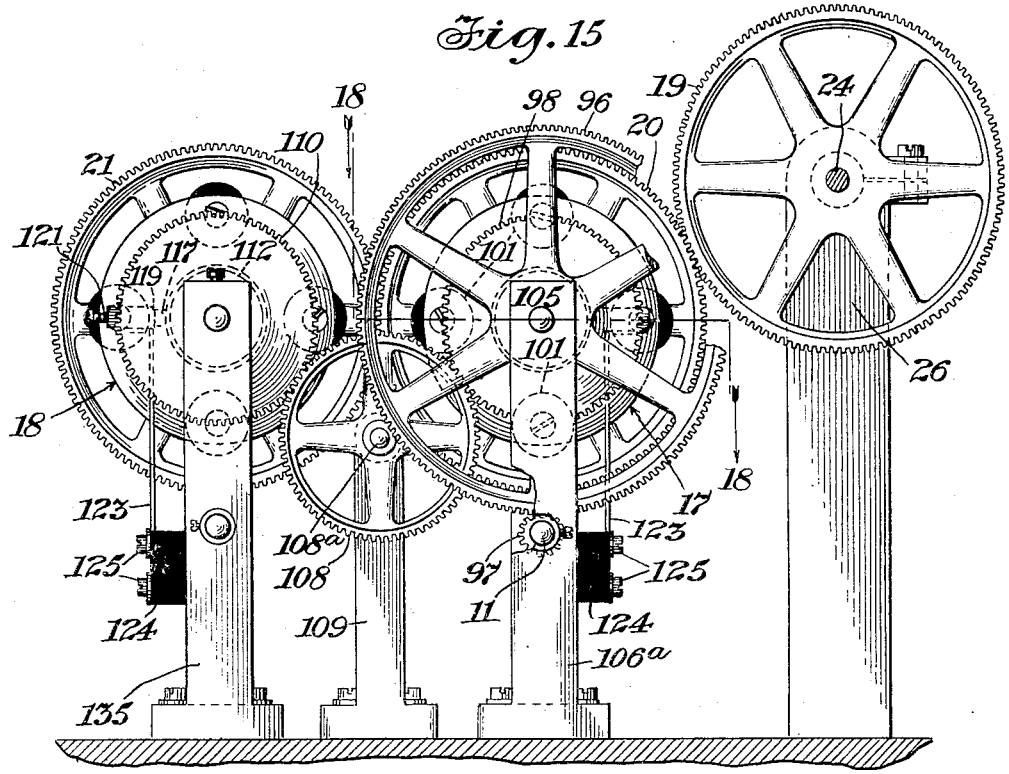

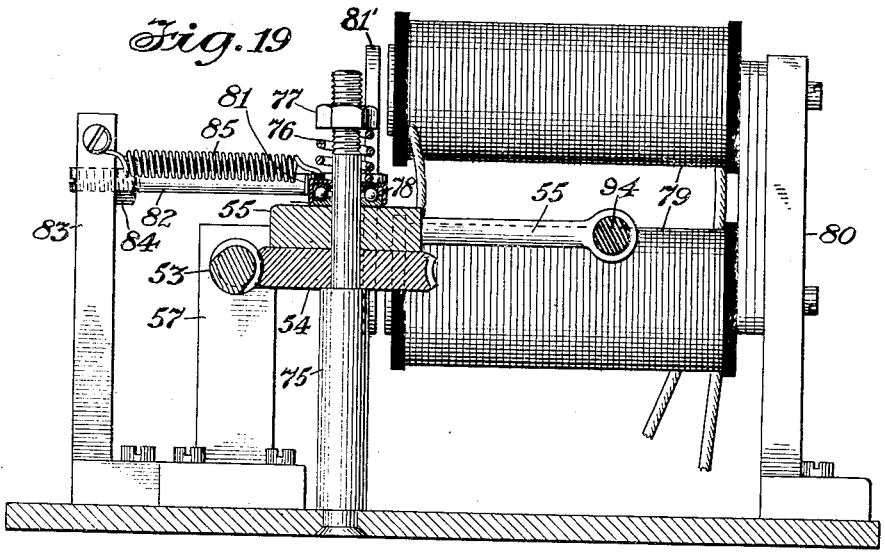
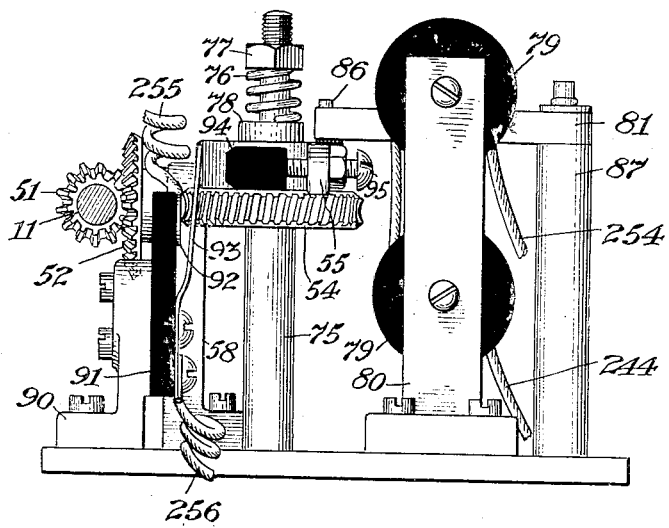
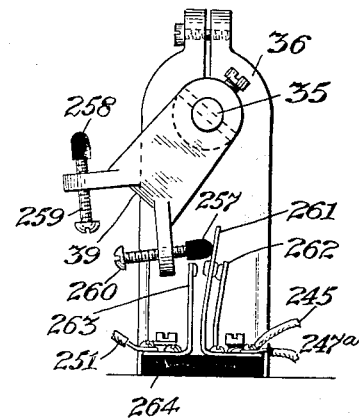

May 1, 1928.
F. S. HEBDEN
1,668,073
AUTOMATIC WEIGHING AND RECORDING MECHANISM
Filed April 2, 1926  13 Sheets-Sheet 9
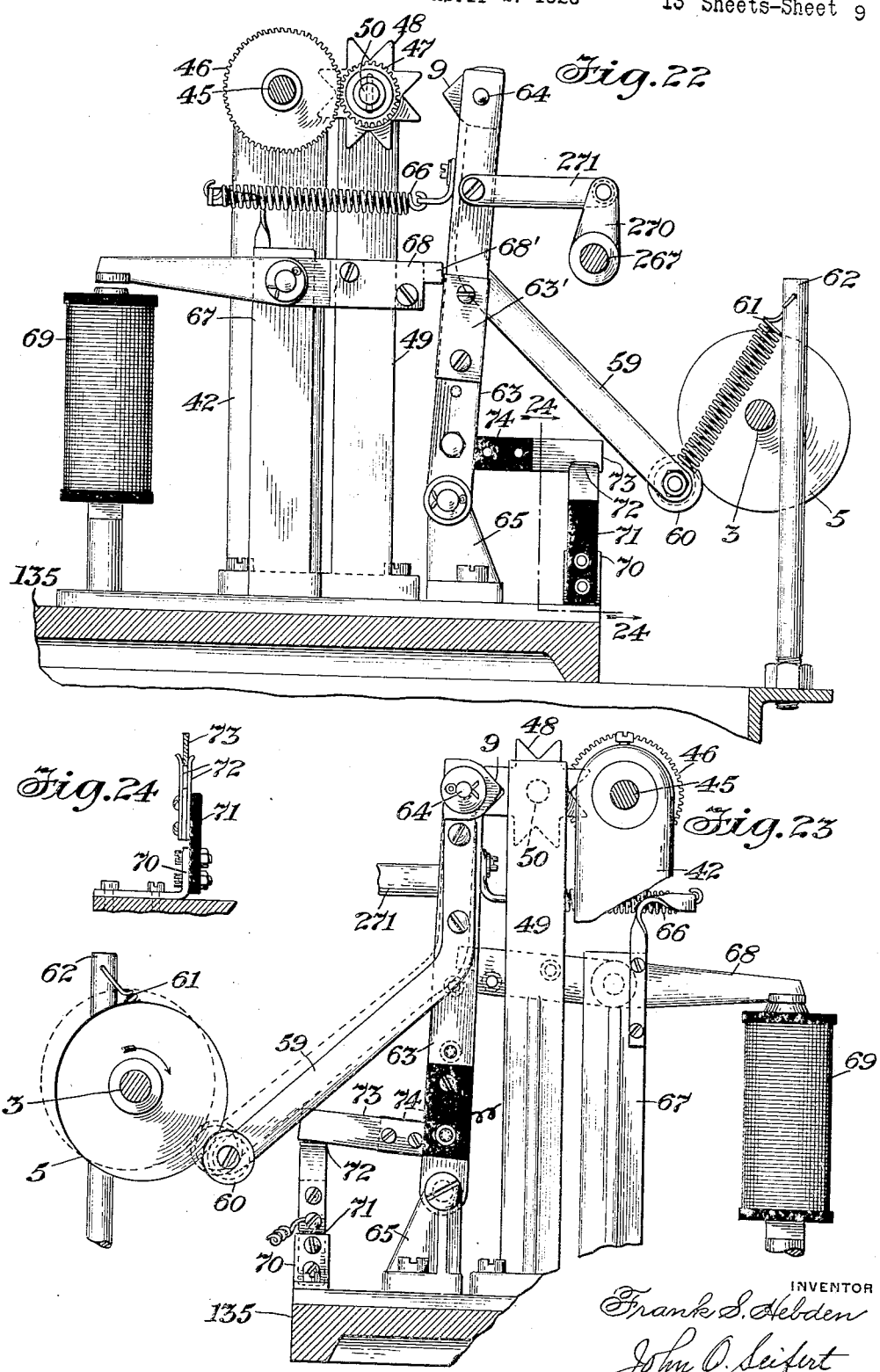

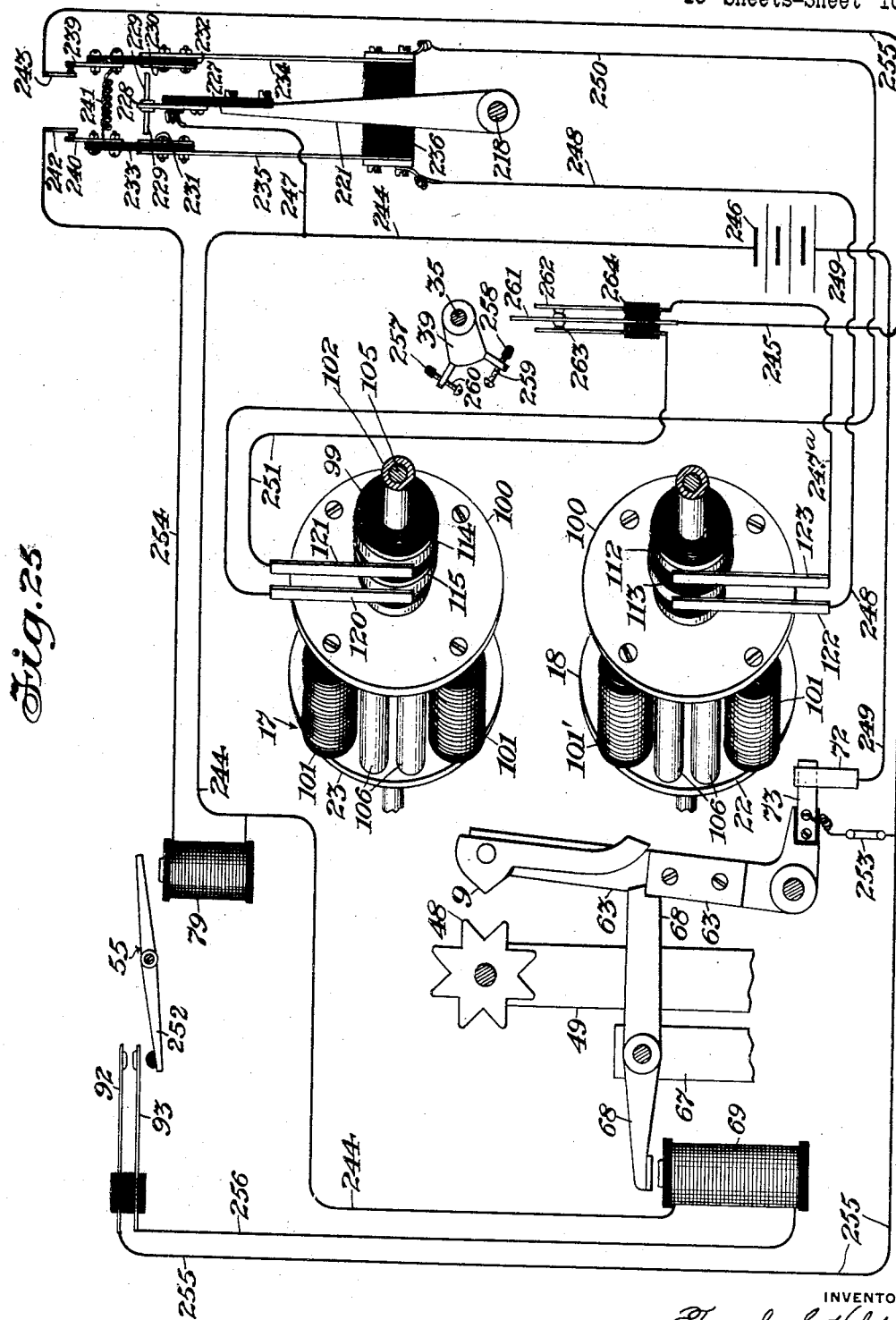

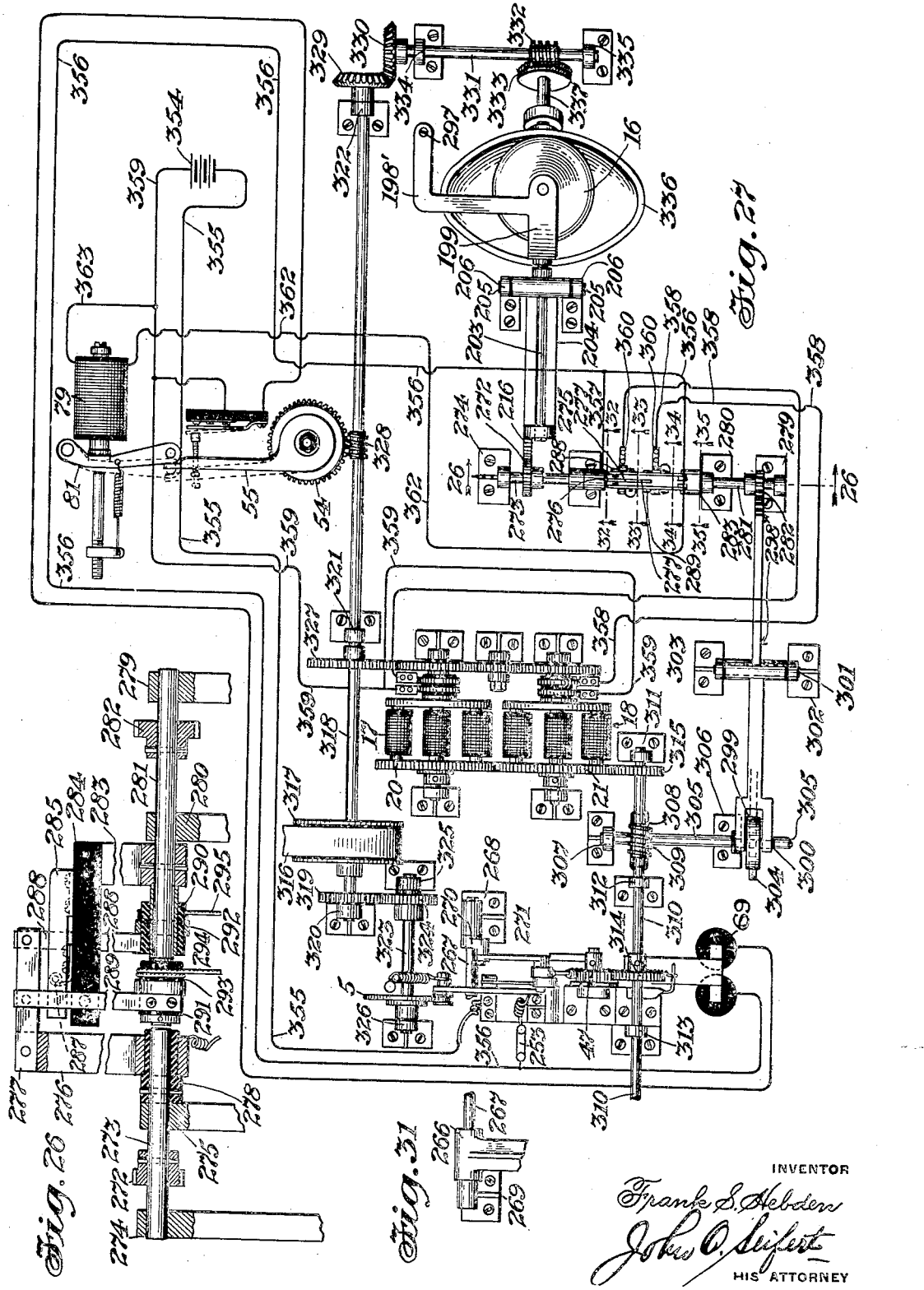

May 1, 1928.
F. S. HEBDEN
1,668,073
AUTOMATIC WEIGHING AND RECORDING MECHANISM
Filed April 2, 1926    13 Sheets-Sheet 12
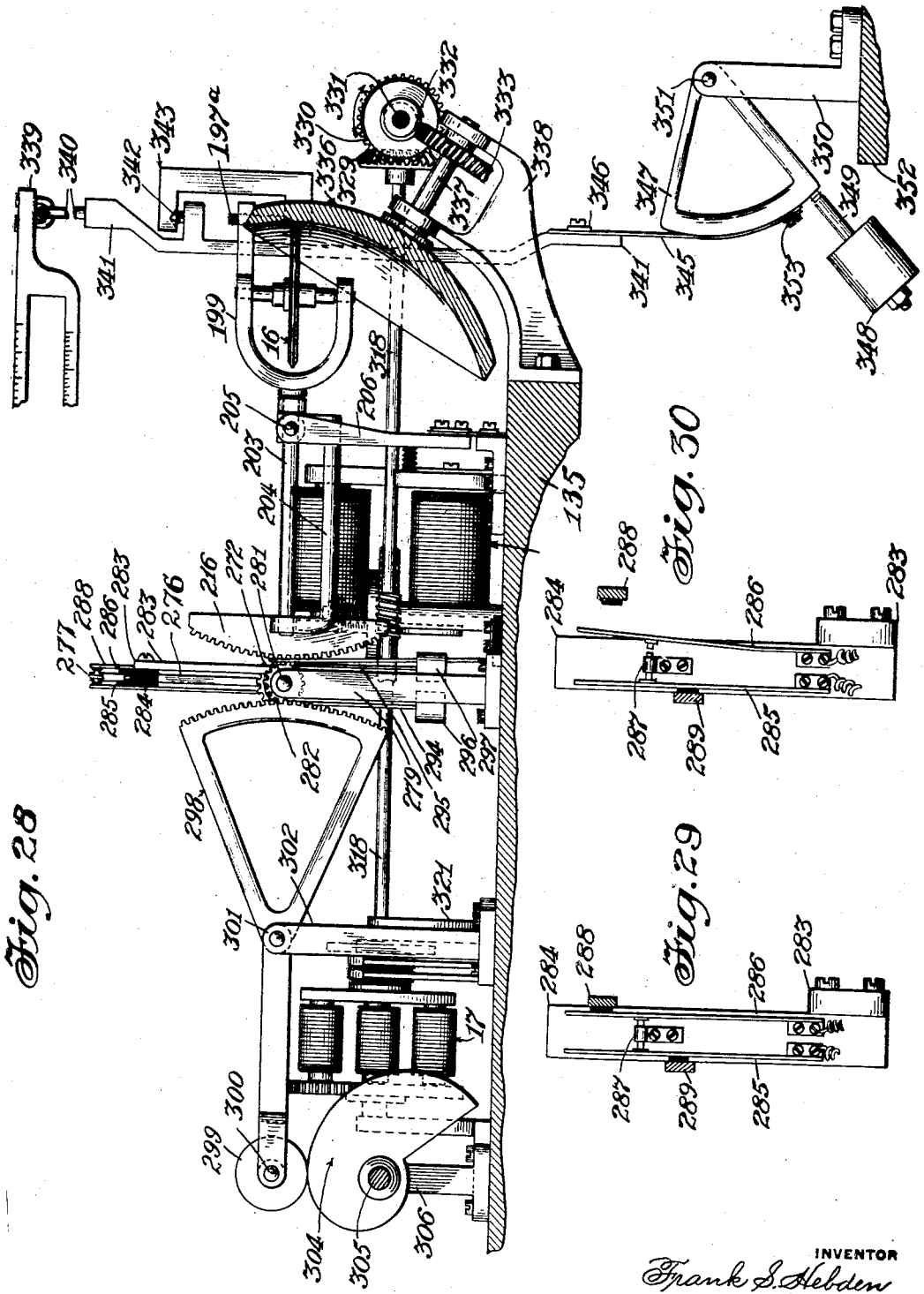
INVENTOR
Frank S. Hebden
John O. Seifert
HIS ATTORNEY

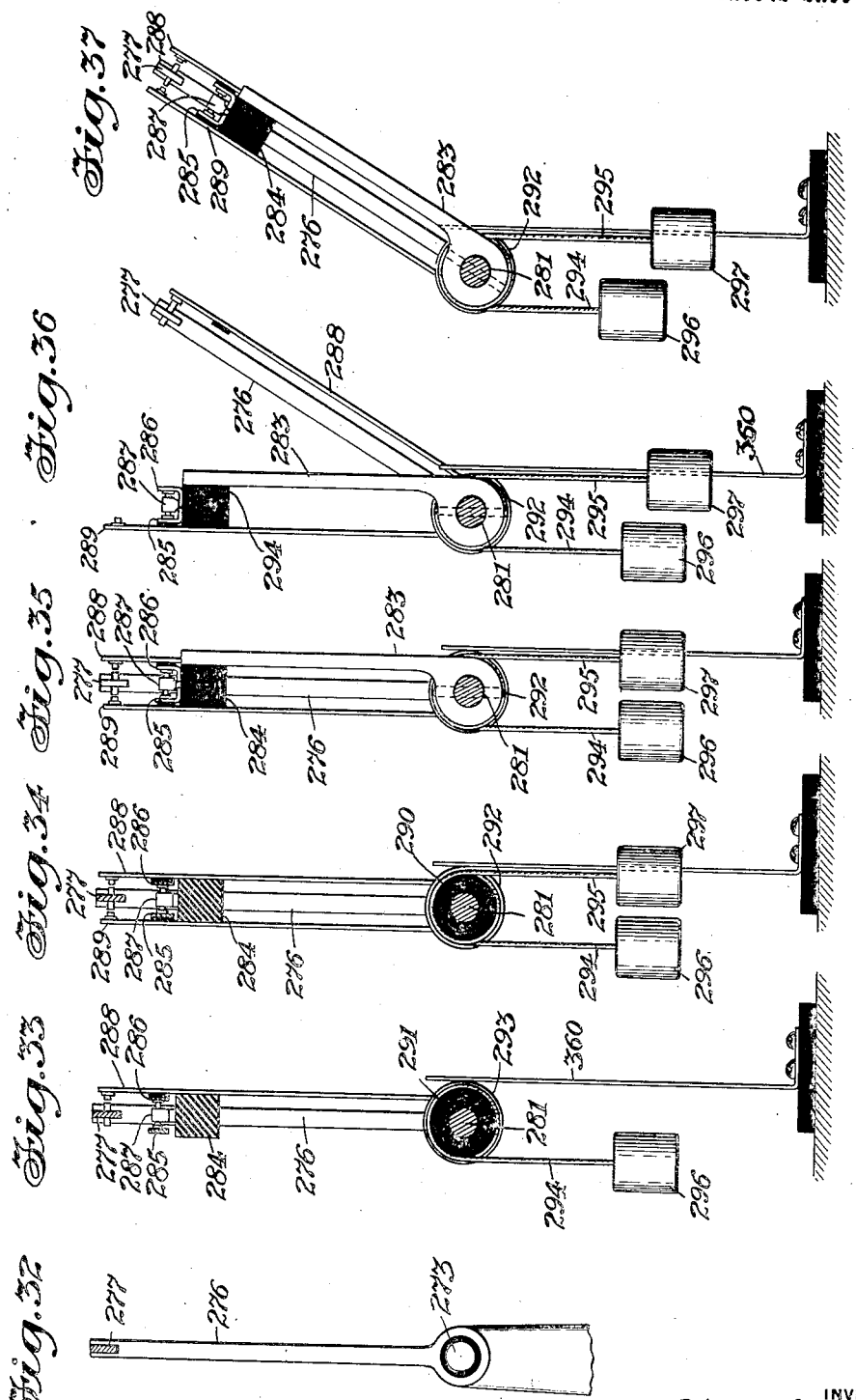

Patented May 1, 1928.

1,668,073

UNITED STATES PATENT OFFICE.

FRANK S. HEBDEN, OF PASSAIC, NEW JERSEY, ASSIGNOR TO MERRICK SCALE MFG. COMPANY, OF PASSAIC, NEW JERSEY, A CORPORATION OF NEW JERSEY.

AUTOMATIC WEIGHING AND RECORDING MECHANISM.

Application filed April 2, 1926. Serial No. 99,210.

This invention relates to automatic weighing mechanism wherein when the weighing mechanism is moved out of equilibrium by the applying or removing of a load therefrom it is brought into balance by the applying or removing of counterpoise weight thereto, and it is the object of the invention to provide an improved constructed and arranged weighing mechanism of this character which is sensitive in operation and whereby an accurate weighing of a load may be obtained.

It is a further object of the invention to provide automatic weighing mechanism which is brought into balance when moved out of equilibrium by mechanically actuated counterpoise adjusting means and to provide electrically operated means to regulate the actuation of the counterpoise weight adjusting means, which electrically operated means is controlled by the movement of the weighing mechanism out of and into equilibrium.

Another object of the invention relates to the provision of recording means combined with and operative from the counterpoise weight adjusting means whereby to make a record of successive weighings.

Other objects and advantages will hereinafter appear.

In the drawings accompanying and forming a part of this specification I have illustrated an embodiment of my invention in which Figure 1 is a plan view.

Figure 2 is an end elevation looking at the right of Figure 1.

Figure 3 is a sectional view taken substantially on the line 3—3 of Figure 1 looking in the direction of the arrows.

Figure 4 is a sectional view taken on the line 4—4 of Figure 1 looking in the direction of the arrows.

Figure 5 is a sectional view taken on the line 5—5 of Figure 4 looking in the direction of the arrows.

Figure 6 is a sectional view taken on the line 6—6 of Figure 4 looking in the direction of the arrows.

Figure 7 is a sectional view taken on the line 7—7 of Figure 1 looking in the direction of the arrows.

Figure 1:
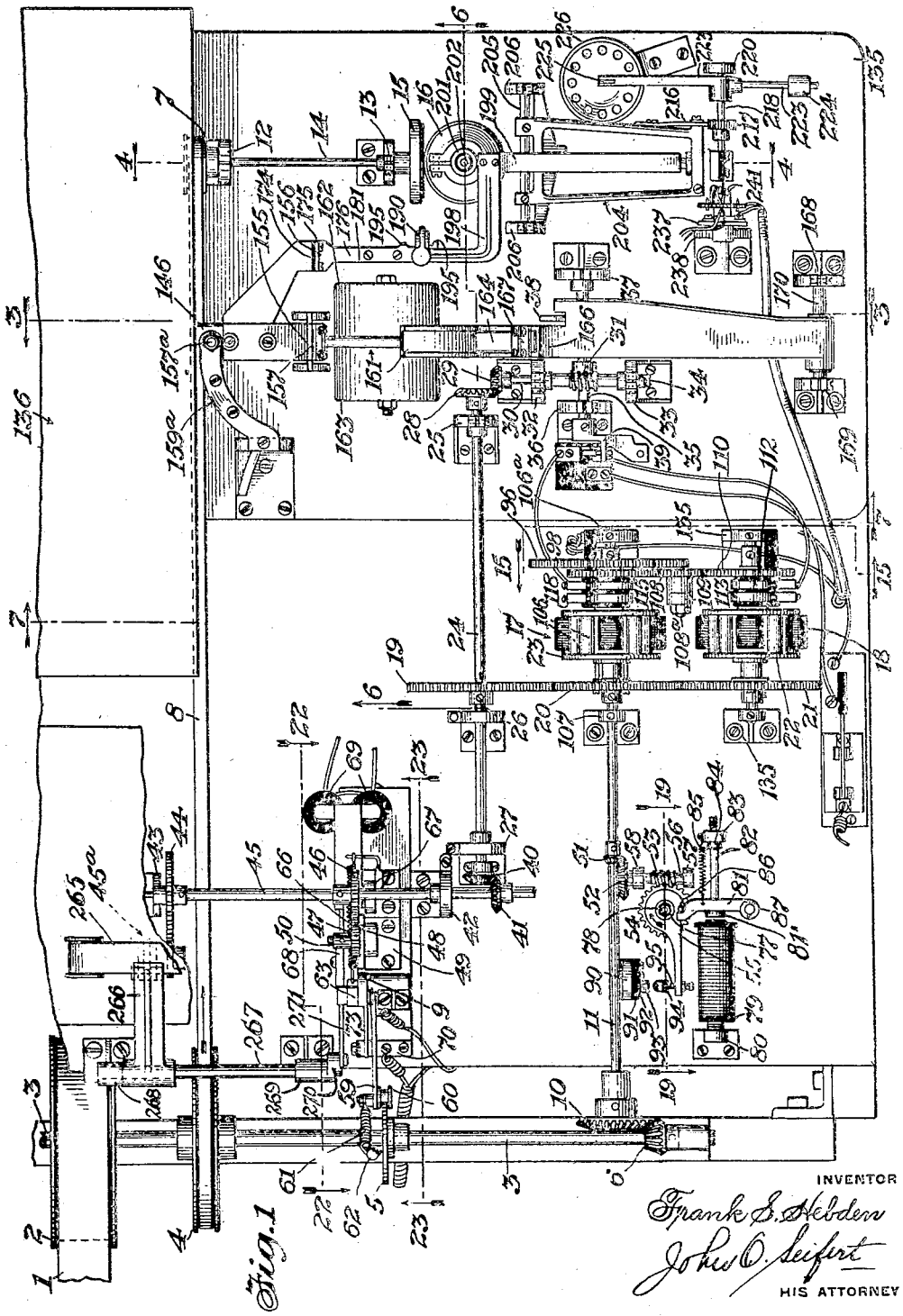

Figures 8 to 13, inclusive, are detail views, partly in section, of the means operative from the weighing mechanism as it is moved out of equilibrium to regulate the actuation of the mechanically operated counterpoise weight adjusting means.

Figure 14 is a detail view in perspective on an enlarged scale to show the mounting of the weighing lever of the weighing mechanism.

Figure 15 is a sectional view taken on the line 15—15 of Figure 1 looking in the direction of the arrows.

Figure 16 is an elevational view looking at the left of Figure 15 and showing electromagnetically operated clutch mechanism for connecting the counterpoise weight adjusting means as well as the weight recording means with driving means therefor.

Figure 17 is a sectional view taken on the line 17—17 of Figure 16 looking in the direction of the arrows and showing in end elevation one of a pair of electromagnetically operated clutches for connecting the counterpoise weight adjusting means and recording means to its driving means.

Figure 18 is a cross sectional view of the electromagnetically operated clutch mechanism taken on the line 18—18 of Figure 15 and looking in the direction of the arrows.

Figure 19 is a sectional view taken on the line 19—19 of Figure 1 looking in the direction of the arrows.

Figure 20 is an end elevation looking at the right of Figure 19.

Figure 21 is an elevational view of a limit switch operative from the counterpoise weight adjusting means to limit the adjustment of the latter.

Figures 22 and 23 are sectional views taken on the lines 22—22 and 23—23, respectively, of Figure 1 looking in the direction of the arrows.

Figure 24 is a sectional view of electric circuit closing means taken on the line 24—24 of Figure 22 looking in the direction of the arrows.

Figure 25 is a diagrammatic view of the electrical hook up of the means to control the coupling of the counterpoise adjusting means with its driving means and adjusting means for the recording means for successive weighings.

Figure 26 is a sectional view taken on the line 26—26 of Figure 27 looking in the direction of the arrows.

Figure 27 is a plan view of a modified construction and arrangement of my improved weighing and recording mechanism and showing in a diagrammatic manner the electrical hook up between electrically controlled parts.

Figure 28 is a side elevation, partly in section, of a modified arrangement of the means controlled by the movement of the weighing mechanism out of and into equilibrium to regulate the coupling of the counterpoise weight adjusting means with its driving means.

Figures 29 and 30 are detail views of circuit closing means embodied in Figure 28.

Figure 31 is a detail view to show the mounting of an impression making device for use in connection with the recording means.

Figures 32 to 35, inclusive, are sectional views of electric circuit closing means embodied in the arrangement of Figure 27 and taken substantially on the lines 32—32, 33—33, 34—34 and 35—35 of Figure 27 looking in the direction of the arrows; and Figures 36 and 37 are views similar to Figure 35 and showing the different positions the parts assume.

In the embodiment of the invention as illustrated in Figures 1 to 25, inclusive, the mechanism is driven from a suitable source of power by a belt 1 which passes around a pulley 2 fixed to a drive shaft 3, said shaft having fixed thereon a pulley 4, a cam 5 and a bevel pinion 6. The shaft 3 is operatively connected to a shaft 14 journaled in bearings 12, 13 by a belt 8 passing around the pulleys 4 and 7, said latter shaft 14 actuating a friction drive surface, in the form of a disk 15 fixed to said shaft to drive the friction wheel 16 contacting therewith, the direction of travel of which friction wheel 16 is adapted to be changed in angular relation to the direction of travel of the friction surface 15 by and in accordance with the movement of the weighing mechanism out of and into equilibrium, or to overload or underload position, by the applying and removing of a load therefrom to actuate electric circuit making and breaking mechanism to control the coupling of the driving shaft 3 to counterpoise weight adjusting means to be hereinafter described. The cam 5 is operative to control justifying means 9 for recording mechanism from which to make a record of successive weighings, also to be hereinafter described. The pinion 6 meshes with a bevel gear 10 fixed to a shaft 11 adapted to be coupled through a pair of electromagnetically operated clutches 17, 18 and gearing 19, 20 and 21 to a shaft 24 to rotate said latter shaft in opposite directions, the gear 19 being fixed to said shaft 24 which is journalled in bearings 25, 26 and thereby operatively connect the driving shaft with actuating means for counterpoise weight adjusting means and with means to actuate the weight recording means.

The shaft 24 is operatively connected to the counterpoise weight adjusting means by a bevel gear 28 fixed to said shaft meshing with a bevel pinion 29 fixed to a shaft 30 journalled in bearings 32, 33, said shaft 30 having a worm 31 fixed thereto meshing with a worm wheel 34 fixed to a shaft 35 journalled in bearings 36, 37, an arm 39 carrying actuators for the electric switch and a cam 38 being also fixed to said shaft 35 for a purpose to be hereinafter described.

The recording mechanism (designated in a general way at 45ᵃ) is operatively connected to and driven from the shaft 24 by a bevel pinion 40 fixed to said shaft meshing with a bevel pinion 41 on a shaft 45 journalled in bearings 42, 43, a gear 44 on said latter shaft meshing with a pinion rotatable with the prime mover of the recording mechanism 45ᵃ, said recording mechanism being constructed and arranged whereby as the shaft 45 is rotated in one direction the recording digit wheels will be advanced and when said shaft is rotated in reverse direction a retrograde movement will be imparted to said recording mechanism.

To justify or aline the digits on the wheels of the recording mechanism to make an impression therefrom justifying means is provided (Figures 22 and 23) embodying the justifying pointer 9 pivotally mounted on a stud 64 fixed in an arm 63 at one end thereof and the arm pivotally supported at the opposite end by a bracket 65. The pointer 9 is connected to one end of a lever 59 carrying at the opposite end a roller 60 and urged in a direction with the roller to engage the cam 5 by a spring 61 connected at one end to the lever 59 and at the opposite end of a fixed post 62. The justifying pointer 9 is adapted to co-operate with a star wheel 48 rotatable with a pinion 47 on a stud 50 fixed in a standard 49, the pinion 47 meshing with a gear 46 fixed to the drive shaft 45 for the recording mechanism whereby the star wheel 48 is rotated when the recording mechanism is actuated and in synchronism therewith and the justifying point having movement toward the star wheel for engagement in a space therein to justify or aline the digits on the digit wheels of the recording mechanism and away from said star wheel by the arm 63. The roller 60 follows the cam 5 which causes a rocking movement to be imparted to the justifying point 9 about its supporting stud through the lever 59 and should the star wheel 48 be positioned when it comes at rest with the digits of the digit wheels of the recording mechanism out of alinement, in which position should the justifying point be moved toward the star wheel it would engage with the point of a tooth or projection of the star wheel instead of in a space between such projections and such rocking or oscillating movement of the justifying point will rotate the star wheel upon its support and stud sufficiently to permit of the justifying pointer to be seated in a space of the star wheel, as shown in Figure 23. The recording mechanism is in the nature of a counter having digit carrying printing wheels and the spaces in the star wheel correspond with definite spaces relative to the digits of the digit wheels. Should the weight of the article being weighed be slightly above or under an exact printing point the justifying point 9 will advance or retract the recording mechanism slightly and thereby bring the digits of the digit wheels in alinement. For instance, should the recording mechanism be arranged to make a record in even ounces the spaces of the star wheel will correspond to one ounce. Should the actual weight of the article being weighed be, for instance, five pounds and one and one-quarter ounce, it would not be possible to record the quarter ounce, the recording mechanism printing five pounds and one ounce. In such case the recording mechanism is retracted by the justifying point 9 engaging a space in the star wheel so that the digit wheels will register five pounds and one ounce. Should the load be exactly five pounds one and one-half ounces the justifying point will engage upon a point of the star wheel, and due to the agitating of said justifying point it will cause the star wheel to either advance or retract and record the weight of the article as either five pounds and one ounce or five pounds and two ounces.

The justifying point carrying arm 63 is urged in a direction to engage the point 9 with the star wheel by a spring 66 connected at one end to the arm and at the opposite end to a standard 67, and held away from the star wheel against the tension of the spring by a latch 68 pivotally supported intermediate its ends on a stud fixed in the standard 67, the one end of the latch being undercut to arrange the latch with a pallet 68' at its end which is adapted to engage a ledge in the form of a plate 63' fixed to the side of the arm 63, the latch being released from said arm ledge 63' through the attractive force of an electromagnet 69 shown as of the solenoid type attracting the opposite end of the latch thereto and thereby rocking the latch sufficiently to release the arm.

The movement of the justifying point toward the star wheel is limited by the latch plate 63' engaging the shoulder formed by the undercut portion of the latch. Electric circuit closing and opening means, for a purpose to be hereinafter described, is also controlled by the justifying means for the recording mechanism which is in the nature of a knife switch and comprises a blade 73 mounted on and insulated from the arm 63 by a block of insulator material 74, which is adapted to be engaged between and in electrical connection with a pair of jaw posts of resilient material 72 mounted on and insulated from a fixed bracket 70 by a block of insulator material 71. When the justifying point 9 is positioned away from the star wheel 48, as shown in Figure 22, and an article is being weighed, the blade 73 is in electrical connection with the jaws 72 and the circuit closed and as the justifying point is moved into engagement with the star wheel the blade 73 is moved out of electrical connection with the jaws 72 and the circuit opened, as shown in Figure 23, rendering the weighing mechanism inoperative.

To regulate the duration of time of the weighing operation or the speed of the mechanism, for a purpose to be hereinafter described, means are provided which is termed as a "balance detector" (Figures 1, 19 and 20) driven from the drive shaft 3 through shaft 11 by the bevel pinion 51 on said latter shaft meshing with a bevel gear 52 fixed to the shaft 56 journaled in bearings 57, 58, said latter shaft having a worm 53 fixed thereon meshing with a worm wheel 54 rotatable on a fixed post 75 in relation to a shoulder of said post, the worm wheel being rotated constantly from the worm 53. A lever 55 is also rotatably mounted on the post 75 in superposed and contiguous relation to the worm wheel 54, the lever being forced into engagement with the side of the worm wheel to be frictionally driven thereby by a spring 76 coiled on the post and confined between a nut 77 threaded onto the end of the post and a ball bearing member 78 arranged contiguous to the lever, and by means of which ball bearing the lever may be rotated in either direction without distorting the spring and does away with the necessity of oiling. The lever 55 is held against rotation by the worm wheel in the direction indicated by the arrow in Figure 1 by a pin 86 fixed in and extending laterally from said lever by the end of a lever 81 pivotally supported upon a fixed post 87 engaging said pin and held in engagement therewith by a spring 85 connected at one end to the lever 81 and at the opposite end to a fixed post 83, the latter lever being guided in its movement by a rod 82 fixed at one end in said lever and slidably engaging in a perforation in the post 83 with a nut 84 threaded onto the end of the rod projecting through the post, said nut serving as a bumper to engage with the post to limit the movement of the lever in a direction to release it from the lever pin 86. The lever 81 is moved to position out of engagement with the pin 86 against the tension of the spring 85 by the energizing of an electromagnet 79, shown as comprising a pair of solenoids, each solenoid being arranged with the cores therein positioned relative to an armature plate 81′ carried by the lever 81 with the opposite ends extending laterally thereof. The movement of the lever toward and away from the magnet is limited and may be varied by the adjustment of the nut 84 on the rod 82. When the lever 55 is released from the holding lever 81 it is rotated in the direction of the arrow shown in Figure 1 through the frictional contact of said lever with the worm wheel 54 causing a head or wiper of insulator material 94 fixed to and adjustbly mounted upon the lever by a set screw 95 to engage with a strip of resilient and conducting material 93, constituting one part of a circuit closing means, and moves the same into contact with the contact making member 92 and thereby establishing an electric circuit, said contact makers 92, 93 being mounted upon an insulator block 91 in insulated relation from each other and the said block being mounted upon a fixed bracket 90.

The electromagnetic clutch mechanism and the means to connect the shaft 11 to the shaft 24 to rotate the same in opposite directions and actuate the counterpoise weight adjusting means and recording mechanism as shown in Figures 1 and 15 to 18, inclusive, comprises a pinion 97 fixed to the shaft 11 meshing with a gear 96 to constantly rotate the same, the gear 96 and a gear 98 are mounted on a sleeve 102 in juxtaposed relation at one end of an insulator sleeve 99 also mounted upon the sleeve 102 in abutting relation to an annular flange at the opposite end of the sleeve 102, and said gears 96, 98 and insulator sleeve 99 being united into a unitary structure with the sleeve 102 by headed bolts 103 extending therethrough and threaded into the flange of sleeve 102. (Figure 18.) A disk 100 of non-magnetic iron is mounted on the sleeve 102 at the side of the sleeve flange opposite to the insulator sleeve 99 connected to the sleeve 102 by threading the bolts 103 into said disk, said disk having studs 101′ of magnetizable material circularly disposed around the same in equidistant spaced relation, as shown in Figure 17, upon which spools carrying energizing coils 101 are carried. The sleeve 102 is rotatably mounted on a fixed shaft 105 mounted in standards 106ª and 107. The coils 101 are connected in series and the terminals thereof extend through an opening in the disk 100 and through the insulator sleeve 99 and electrically connected with collector rings 114, 115 mounted upon the insulator sleeve with which brushes in the form of carbon blocks 116, 117 mounted in tubular carriers 118, 119 contact, and adapted to be adjusted in said carriers toward the collector rings by screws 120, 121, and by which screws the brush carriers are mounted upon strips of resilient material 122, 123 whereby the brushes are yieldingly maintained in contact with the collector rings, said strips being fixed upon an insulator block 124 and arranged with binding posts for the connection of electric current conductors, and the insulator block fixed to the standard 106ª by screws 125. A disk 23 to serve as armature to the magnets 101 is mounted on the shouldered end of a sleeve 123 also rotatably mounted on the shaft 105, the gear 20 being mounted on the opposite shouldered end of said sleeve, and said gear, armature disk 23 and sleeve are united in a unitary structure by bolts 129. The sleeves 102, 128 are mounted upon the shaft 105 between a pair of collars 130, 131 with the ends of studs 106 of non-magnetizable material, such as brass, fixed in the disk 100 in pairs in interposed relation to the magnets 101 contacting with the armature disk 23, said disk studs being of a length to extend slightly beyond the ends of the cores 101 of the magnets to prevent actual contact of said cores with the armature disk and thereby eliminating the effect of residual mechanism, the studs 106 also providing a large wearing surface. As the gear 96 is rotated the entire unit consisting of the gear 110, insulator sleeve 99 and magnet carrying disk 100 is rotated and as the magnet cores are energized through the magnetic attraction of the armature disk 23 thereto said disk and the connected gear 20 are rotated and through said gear meshing with the gear 19 the shaft 24 is rotated and the counterpoise weight adjusting means and recording means are actuated.

The shaft 24 and connected counterpoise weight adjusting means and recording mechanism are actuated in reverse direction by means of the clutch 18 which is substantially the same construction and arrangement as the clutch mechanism 17 hereinbefore described, said clutch mechanism 18 being actuated from the shaft 11 through the gear 98 rotatable with the gear 96 meshing with an idler gear 108 rotatably mounted on a stud 108ª (Figure 15) fixed in a standard 109, said gear 108 meshing with a gear 110 mounted on a shaft through a sleeve similar to the gear 96, magnet carrying disk 100 and insulator sleeve 99, said unit being rotated constantly and with an armature disk 22 mounted co-axially thereof connected with the gear 21 being rotated when the magnets of said clutch mechanism are energized and thereby through the gears 20, 19 rotating the shaft 24 in a direction opposite to that in which it was rotated through the clutch mechanism 17. The clutch mechanisms are connected in open circuits with a source of electricity and as one clutch mechanism is connected in circuit the circuit of the other clutch mechanism is opened, and for the purpose of facilitating the describing of said circuits hereinafter collector rings in connection with the clutch 18 are indicated by 112 and 113. The brushes to contact with said collector rings together with the carriers therefor and resilient strips upon which the carriers are mounted are indicated by the same reference characters (Figure 18), and said strips being mounted on and insulated from one of a pair of standards 105 in which the shaft is fixed upon which the clutch mechanism is mounted.

The weighing mechanism comprises a load receiving platform 136 supported upon a frame 137, which frame in turn is supported at one end of a main weighing beam or lever 146, said lever being supported to have rocking movement by a yoke piece 143 mounted upon standards 141, 142, the connection between the yoke piece 143 and the lever comprising a pair of thin plates of flexible material 147 one at each end of the load receiver secured to the yoke piece and lever with a small gap between the two, the flexibility of the plates allowing the lever to rock or vibrate much in the same manner as the lever or beam would rock were it supported by a knife edge pivot bearing as is the usual practice of supporting the weighing lever in weighing mechanism. The frame 137 is connected to said weighing lever by a flexible plate 148 similar to the plate 147 and intermediate said latter plates, the plate 148 being secured at one end to the lever 146 and at the opposite end with the frame 137 with a small gap between the two, whereby when the outer end of the lever 146 is raised or lowered the plate 147 will act as a fulcrum and the frame will be raised and lowered in proportion to the leverage. To prevent sidewise tilting movement of the platform 136 when a load is placed thereon off center a stabilizing lever 138 is provided, said lever being of yoke shape with each leg thereof rigidly attached to the platform at equidistant points at opposite sides of the longitudinal center of the platform, the lever being mounted upon a block 149 mounted upon a table 135 forming a part of the framework of the weighing mechanism. However, as the lever 138 is rigidly secured to the platform supporting frame 137, and as said frame must participate in the movement of the weighing lever 146 without any hindrance from the lever 138, and to permit of this and at the same time prevent any movement of the platform about its longitudinal axis the lever is supported by the block 149 through a strip of flexible material 150 secured at opposite ends to the lever and block with a gap between the two, as shown in Figure 7, and to stiffen the plates 150 a stiffening member 151 is clamped to said plate at opposite sides thereof with gaps A, B between the ends of said stiffening member, the block 149 and the lever, thus permitting the lever 138 to participate in the movement of the load receiver with the weighing beam or lever while maintaining the load receiver against tilting movement about its longitudinal axis by a load placed thereon off center. By this arrangement as the load receiver is moved vertically through the action of the weighing lever 146 the flexible strip 150 will be moved through the same arc as the weighing lever, thus maintaining the vertical relation between the parts and the platform in a level position. To prevent the lateral movement of the platform 137 without interfering with the vertical movement thereof a pair of arms 139, 140 are fixed to and extend laterally from the yoke member 143, said arms having an upwardly extending portion at the free end whereby they are connected to the frame by plates of flexible material, as shown at 152, 153, in a manner similar to the connection 150 of the lever 138 with the block 149. By this arrangement a sensitive weighing mechanism is provided without the use of loose parts, wearing parts or parts having loose motion.

The weighing lever 146 at the end opposite to its connection with the load support carrying frame 137 has a pair of arms 155, 156 fixed thereto, the arm 155 having a part extending upward substantially at a right angle to the weighing lever, and the arm 156 extending laterally therefrom in a substantially horizontal plane. The vibratory movement of the weighing lever is limited by adjustable stops in the form of set screws 157$^a$, 158 threaded into arms 159$^a$ fixed to a standard 158' to extend laterally therefrom in parallel and spaced relation one above and the other below the weighing lever, the weight of the arms 155, 156 together with other parts attached to said end of the weighing lever being counterbalanced by a weight 145 adjustably mounted upon a supporting rod 144 fixed at one end in the weighing lever to extend forwardly thereof and opposite to the arms 155, 156 carried by said weighing lever (Figure 2).

A member 158$^a$ is suspended from and flexibly connected to the angle portion of arm 155 by a strip 157 of flexible material, such as a steel strap, secured to said arm by clamping members and screws, as shown at 160, the other end of said strip being secured to the member 158$^a$ in a similar manner by clamping members and screws, as at 178. The member 158$^a$ at the end opposite to that at which it is connected with the arm 155 is arranged with a bifurcation the legs of which bifurcation having alined perforations therethrough in which are mounted broadened bearing rings 159 (Figures 2, 3, 6, 7, and 14). A segment 161 having weights 162, 163 mounted thereon has oppositely extending hub portions 161' with the extremities arranged as knife edge pivots 160' which are engaged in the rings 159 to pivotally support said segment from the suspender member 158ª. This segment with the weights has been termed herein a "pendulum counterpoise weight". The circular plate of the segment is in the arc of a circle whose center is the center of the knife edge pivots and has a recess therein for the engagement of a steel strap 164 secured at one end to the segment, as at 165, the opposite end of the strap being secured at 167 in a recess in the circular post of a second segment 166 arranged in opposed relation to the segment 161 and with the circular faces of the segments in contact, the segment 166 being integral with an arm whereby it is fixed upon a shaft 170 rotatably supported in standards 168, 169 fixed upon the table 135 of the framework of the weighing mechanism. The circular face of the segment 166 is in an arc of a circle whose center is the center of the segment supporting shaft 170. By the connection 167 of segment 161 to segment 166 and the pivotal support thereof by the knife edge pivots 160' in the suspender 158ª said segment 161 with the weights mounted thereon is supported from the one end of the weighing lever through the suspender 158ª and the segment 166. The segment 166 is supported by and raised and lowered through the rotation of the cam 38 actuated as hereinbefore described engaging a cam following roller 171 fixed to a shaft 173 journaled in bearings 172 at one end in the segment and at the opposite end in a part 166' extending laterally of and in spaced relation to the segment arm. The counterpoise weights 162, 163 due to the supporting of the segment 161 are suspended between the pivotal support 159 of the segment by the one end of the weighing lever 146 and from the support of the cam following roller 171 upon the cam 38 through the connection of said segment with segment 166, and such position of the pendulum weights is varied by and in accordance with the raising and lowering of the segment 166 through the actuation of the cam 38, and thus applying and removing of the counterpoise weight to and from the weighing lever is proportionally increased and decreased with the positioning of the counterpoise weights.

As stated, the free end of the segment 166 is supported through the roller 171 by the cam 38. Therefore, if the cam is rotated in one direction the segment 166 is raised and if it is rotated in reverse direction the segment is lowered. The movement of segment 166 is transmitted to segment 161 swinging the latter on its pivotal support 159 through the strap connection 164, and should the segment 166 be raised as shown in dotted lines in Figure 7, the segment 161 is raised a proportional distance thereby changing the center of gravity of the weight system 162, 163 by moving the same away from the pivot support 159 and thereby relieving or subtracting from the force of said weights upon the weighing lever 146. Should the segment 166 be lowered by rotating the cam 38 in the opposite direction the segment 161 will be proportionally lowered, as shown in full lines in Figure 7, thereby shifting the center of gravity of the weight system 162, 163 toward the pivotal support 159 of segment 161 and having an effect of applying or adding weight to the weighing lever.

As hereinbefore stated the recording mechanism 45ª is actuated in synchronism with the cam 38 or the counterpoise weight adjusting means. For this purpose the cam 38 may be calibrated or graduated to correspond with the recording mechanism, and whereby the calibration on the cam in line with the axis of the cam following roller 171 will correspond with the exposed digits of the digit wheels of the recording mechanism.

As stated, the actuating means for the counterpoise weight adjusting means and the recording mechanism is coupled to the driving means therefor through the electromagnetic clutches 17, 18 which are connected in open circuit with a source of electricity and by the closing of which circuits the clutches are actuated, the actuation of the clutches being regulated by circuit making and breaking means controlled by the movement of the weighing mechanism out of equilibrium; that is to overload or underload position, by the applying of a load thereto or the removing of a load therefrom. With the weighing mechanism in equilibrium the weighing lever 146 will be in position midway between the stops 157ª, 158. When a load is placed upon the load receiver 136 supported by one end of the weighing lever the opposite end of said lever is moved into contact with the stop 157ª and in order to counterbalance the load or bring the beam into equilibrium counterpoise or counterbalancing weight must be applied to the lever, which is accomplished by the actuating of the cam 38 to lower the segment 166 and thereby the segment 161 moving the center of gravity of the counterpoise weights 162, 163 toward the pivot support 159 of said latter segment or the end of the weighing lever adding weight to the weighing lever until said weight counterbalances the load and the weighing lever is moved into equilibrium. Simultaneously with the rotation of the cam 38 the digit wheels of the recording mechanism 45ª have been advanced through the connection of said weighing mechanism with the cam actuating means hereinbefore described, so that should the weight of the load be five pounds the recording mechanism will be advanced to indicate five pounds when an impression may be made therefrom, and due to the calibrating of the cam 38 a corresponding weight indication is indicated by the cam in the manner hereinbefore described.

The circuit making and breaking means and the means to actuate the same controlled by the movement of the weighing lever is shown in Figures 1, 2, 4, 5, 6, 8 to 13 and 25 and embodies the friction wheel 16 having frictional contact with the disk 15, this wheel with the weighing mechanism in equilibrium travelling in the same direction as the disk 15, and the direction of travel of said wheel being adapted to be changed in angular relation to the travel of the disk 15 by and in accordance with the movement of the weighing lever into overload or underload position and thereby actuate circuit making and breaking means to close the circuit of either one of the electromagnetic clutches 17, 18 to render the same effective and simultaneously act upon the closing of the circuit of the other clutch to render the same ineffective. This friction wheel 16 is fixed to a shaft 200 rotatably mounted in bearings 201, 202 in the bifurcated end of a frame 199 fixed to a shaft 203 rotatably mounted in a second frame 204 to have movement in said latter frame about the axis of said shaft 203. (Figures 4 and 5). The frame 204 is fixed to a shaft 205 extending transversely and at right angle to the axis of the shaft 203, said shaft 205 being rotatably mounted by bearings 207, 208 in a frame 206, the latter frame being supported by a bracket 211 fixed upon the table 135 to have rocking or vibratory movement and connected to said bracket by plates 209 of flexible material and screws 210, 212, the frame 206 being urged to a predetermined position by a spring 213 coiled about a screw 215 threaded into the table 135 and confined between the frame and a pair of lock nuts 214 threaded onto the set screw, the screw being adapted to be screwed into the table 135 to a variable extent and then locked in such position by said lock nuts. A rack 216 is fixed to one side of the frame 204 to project from the end of said frame opposite to the wheel 16 and adapted to mesh with a pinion 217 fixed to a shaft 218 rotatably mounted in bearings 219 in standards 220, (Figure 2,) an arm 221 also being fixed upon said shaft 218 having a counterweight 222 mounted thereon to counterbalance the arm, said arm carrying a contact in insulated relation thereto to cooperate with a pair of contacts to close the circuits of the clutches 17, 18 in a manner to be hereinafter described. A second arm or lever 223 is fixed to shaft 218 (Figure 1) having a counterweight 224 adjustably mounted on one end, a plunger 225 being pivotally connected to the other end and slidably engaging in a dash pot 226 and functioning to steady and prevent undue chattering or vibration of the various levers.

The friction wheel carrying frame 199 has an operative connection with the weighing lever 146 whereby the frame is adapted to be rocked about the axis of the shaft 203 to change the direction of travel of the friction wheel 16 in angular relation to the direction of travel of the friction disk 15 by and in accordance with the movement of the weighing lever out of and into equilibrium, this connection comprising a lever 181 supported by a standard 185 to have flexing or rocking movement through a plate of flexible material 183, said plate being secured by clips 184 to the lever and by clips 186 to the standard 185 with a small gap between the standard and the lever. The lever 181 is connected to the weighing lever 146 by a connecting bar 176 connected to the lever 181 through a plate of flexible material 179 secured to the lever and bar by clips 180 and 182, the connecting bar 176 being connected at the opposite end with the laterally extending arm 156 of the weighing lever 146 through a plate of flexible material 174 secured by clips 175, 177, thus providing flexible connection between the weighing lever 146 and lever 181. The lever 181 is counterbalanced by a weight 187 adjustably mounted on an arm 188 fixed in and extending laterally of the lever.

The connection of the lever 181 with the friction wheel carrying frame 199 is through an angle arm 198 fixed at one end to said frame (Figure 1) and a yoke shape link 190 supported at one end by a pivot screw 189 threaded into one end of the lever 181 upon which is engaged a bearing 191 in one leg of the link 190, the lever 198 being connected to said link by a pivot screw 197 threaded into said lever engaging a bearing 192 in the other leg of the yoke link, the latter being held against canting movement by the pivot screws by counterbalancing weights 193 adjustably mounted on a rod 194 fixed at one end in that portion of the yoke link in which the bearing 191 is arranged to extend oppositely to the connecting portion of the link, the yoke link being held against rotation by guards 195 fixed to the lever 181 engaging at opposite sides of the yoke link (Figures 1 and 6). To prevent the pivot screw 197 from being displaced from the bearing 192 a guard 196 is fixed to the yoke link to extend laterally thereof and over the pivot screw. It will be obvious that as the weighing lever 146 is moved to overload or underload position participating movement of a greater extent will be imparted to the arm 198 thereby moving the friction wheel carrying frame 199 about the axis of shaft 203 and thereby changing the direction of travel of the friction wheel 16 in angular relation to the direction of travel of the friction disk 15.

The relation of the friction wheel 16 relative to the driving disk 15 is substantially as that shown in Figures 8 and 9. Should the weighing lever 146 be moved downward as by the removal of a load from the load receiver into engagement with the stop 158 participating movement slightly multiplied will be imparted to the friction wheel carrying frame 199 about the axis of the shaft 203 in frame 204 changing the direction of travel of the friction wheel 16 relative to the direction of travel of the friction disk 15 from the Figure 8 to the Figure 10 position, thus causing the friction wheel 16 to travel in a spiral path upon the friction disk 15 in a direction toward the center of disk 15 (Figures 12 and 13) with the disk rotating in the direction indicated by the arrow in Figure 9, thereby rocking the frame 204 about the axis of shaft 205 and causing the rack 216 attached to said frame and meshing with the pinion 217 to move the frame 221 to the left as viewed in Figure 4 and thereby closing the circuit for one of the clutches 17, 18 energizing the same and effecting an adjustment of the pendulum counterpoise weight to bring the weighing beam into balance and thus bringing the friction wheel 16 through the adjustment of the weighing lever back to the horizontal position shown in Figure 8, and the frame 204 as well as the lever 221 to the positions shown in Figure 4. Should the weighing mechanism be moved to overload position by a load upon the load receiver with the weighing lever in contact with the stop screw 157ª the friction wheel carrying frame 199 will be moved about the axis of shaft 203 in frame 204 in a direction reverse to that indicated in Figure 10, the friction wheel thereby effecting an adjustment of the frame 204 about the axis of shaft 205 and moving the lever 221 to the right as viewed in Figure 4, thereby closing the circuit for an electromagnetic clutch to effect an actuation of the counterpoise adjusting means to apply the pendulum counterpoise weight to the weighing lever 146 to bring the same into equilibrium and bringing the friction wheel 16 back to the Figure 8 position and the frame 204 as well as the lever 221 to the Figure 4 position.

The electrical hook up of the electromagnetic clutches 17, 18 with the source of electricity and controlled by the movement of lever 221 imparted thereto by the friction wheel carrying frame 199, 204, is substantially as shown in Figures 2, 4 and 25 and is as follows. The lever 221 has a block of insulator material 227 secured thereto upon which is mounted a metallic plate 228 which carries in electrical connection therewith a contact maker in the form of a bar 229 extending through and from opposite sides of the plate. This contact maker when moved to the right will make electrical contact with a contact plate 230 and when moved to the left with a contact plate 231, said contact plate being mounted upon blocks of insulator material 232, 233 by screws passing through said insulator blocks and resilient metallic strips 234, 235, the screws uniting and electrically connecting the contact plates 230, 231 with the strips 234, 235, the latter being mounted upon an insulator block 236 mounted upon a plate 237 supported by a standard 238. Metallic plates 239, 240 are mounted upon the outer ends of insulator blocks 232, 233, the plates being electrically connected by a flexible conductor 241, and normally contact with fixed contact plates 242, 243. The strips 234, 235 are resilient and yielding. Should the lever 222 be moved so that the contact 229 is engaged with either of said strips they will be flexed and break contact between the contacts 239 and 243 or between the contacts 240 and 242, such movement of the lever will also make contact between the contact 229 and either of contacts 230 or 231. As contact is made between contacts 228 and 231 contact will be broken between contacts 239 and 243. Following the electric circuits the contact 228 is connected to battery 246 through conductors 244, 247 and should contact be made through contacts 228 and 230 the current will flow from the battery through conductor 244, 247, contacts 228 and 231, strips 235, conductor 248, contact maker 132, collector ring 113, coils 101 of clutch 18 to collector ring 112, contact 123, conductor 247ª to contact makers 262, 261, of limit switch 39, (to be described in detail hereinafter) through conductor 245 to conductor 255 through switch 72, 73 and conductor 249 to the battery, and thus energizing the clutch 18 and through said clutch actuating the counterpoise weight adjusting means and recording mechanism.

Should the circuit be established through the contacts 228 and 230 the current passes through the battery 236 through conductors 244, 247, contacts 228, 230 to strip 234, conductor 250, to contact 120, collector ring 115, coils 101' of magnet 17 to collector ring 114, contact 121, conductor 251 through contact makers 263, 261 of limit switch 39, thence through conductors 245, 255, switch 72, 73, conductor 249 to the battery and thus energizing the clutch 17 and through such clutch actuating the counterpoise weight adjusting means and recording mechanism in a direction reverse to that when they are actuated by the clutch 18.

The balance detector indicated by 55 in Figures 1, 19 and 20 is shown in a conventional manner in Figure 25 and indicated by 252, the actuating magnet and contacts being indicated by the same reference characters. With the weighing mechanism in equilibrium and the contact carrying arm 221 in position with the contact 229 intermediate and out of contact with the contacts 230, 231 the resilient strips 234, 235 will cause the contacts 240, 242 and 239, 243 to be in contact. In this position of the contacts the current will flow from the battery 246 through conductor 244 to the coil of electromagnet 79, from said coil through conductor 254, contacts 242, 240, conductor 241, contacts 239, 243, conductor 255, switch 73, 72, and conductor 249 back to the battery and thus energizing the magnet 79. Should either of the contacts 239 or 230 be out of contact with contacts 243 or 242 and thus opening the circuit the magnet 79 will remain inactive.

Assuming the magnet 79 has been energized the one end of the lever 252 will be attracted to it, thereby moving the other end of said lever into engagement with contact 93 moving said contact into contact with the contact 92 and thus closing the circuit of magnet 69 and operating the latch 68 to release the carrying lever 63 for the justifying point 9 and permitting this point to be moved into engagement with the star wheel 48 by the spring 66 (Figures 22 and 23) in a manner as hereinbefore described. As the circuit is closed by the contacts 92, 93 the current flow is from battery 246 through conductor 244 to the coil of magnet 69, through conductor 256 to the conductors 93, 92, to conductor 255, switches 253, 73, 72, conductor 249 back to the battery and thus energizing the magnet 69. The result of making contact between contacts 240, 242 and 243, 239 is to energize the magnet 79 thereby causing contact to be made between 92, 93, closing the circuit of and energizing the magnet 69 and attract the latch 68 thereto and releasing the lever 63. When the lever 63 is released and the justifying point 9 is engaged with the star wheel the blade 73 attached to the lever 63 is moved out of contact with the contact post 72 thereby opening the circuit to the battery rendering the entire mechanism inactive, and the mechanism will remain in this condition until the lever is restored to its original position with the contact blade 73 engaging between the contact posts 72. This is for the purpose of having all of the parts at rest until an article is to be weighed.

When an article is to be weighed the article is placed upon the load receiver 136. The lever 63 is then positioned with the justifying point away from the star wheel and held in such position by the latch 68 thereby closing the circuit through switch 73, 72, and after the weighing operation is completed the cycle of operations hereinbefore described will be repeated and the mechanism again rendered inactive through the opening of the circuit through switch 73, 72. A manually operated switch 253 is provided to maintain the circuit open and thus render the operative mechanism inactive when it is desired to make repairs or otherwise.

By the arrangement of the adjustment of the nut 84 on the rod 82 carried by the lever 81 of the balance detector for engagement with the bumper 83 the duration of the time of a weighing operation is determined. Should the nut be adjusted on the rod 82 in a direction toward the magnet 79 the lever 81 will be moved a greater distance away from the magnet through the action of the spring 85 and through the connection of the lever 81 with the pin 86 of the carrier 55 for the contact actuator 94 positions said contact actuator 94 a greater distance away from the contact 93. Should the nut 84 be adjusted on the rod 82 in a direction away from the magnet 79 the contact actuator 94 will be positioned closer to the contact 93 through the engagement of the lever 81 with the pin 86 in carrier 55. As the worm 54 is rotated at a slow speed it will be obvious that the length of time required for the contact actuator 94 to reach the contact 93 is in this manner varied and thereby the duration of the period of the weighing operation predetermined. Should the lever be positioned some distance from the magnet 79 the contact actuator 94 will be positioned a corresponding distance away from the contact 93 and will require, for instance, two seconds to reach the contact 93 and move it into contact with contact 92 to close the circuit of magnet 69 to actuate the latch 68 to release the lever 63. If it is desired that the duration of the time of travel of the contact actuator 94 and the weighing operation be reduced, for instance to one second, the nut 84 is adjusted toward the bumper 83 so that the lever 81 will hold the carrier 55 for the contact actuator 94 with the latter one-half the distance from the contact 93 as compared with the former adjustment. This adjustment is for the purpose of giving the levers time to settle when the weighing mechanism is located in buildings where it is subject to building vibrations and the like, and for the purpose of timing the delivery of the articles weighed from the scale to other departments. The limit switch comprising the contact makers 261, 262 and 263 (Figure 25) interposed in the circuit is for the purpose of limiting the travel of the cam 38 to the capacity of the weighing mechanism, and should the cam travel beyond such limits to render the mechanism inactive. These contacts are mounted on an insulator block 36 and actuated by the arm 39 fixed to and actuated from the cam shaft 35. (Figures 1, 7 and 21.) A pair of switch actuators 257, 258 of insulator material are adjustably mounted upon carriers in the form of set screws 259, 260 threaded into ears diverging laterally from arm 39. When the cam 38 is rotated to raise the segment 166 to its limit the contact actuator 258 is brough into engagement with the contact 261 and by the continued rotation of the cam shaft said contact is moved out of contact with the contact 262 and opening the circuit. When the cam is rotated in reverse direction to lower the segment 166 to the limit of its downward movement the contact actuator 257 is brought into engagement with the opposite side of contact 261 and by the continued rotation of the shaft said contact will be moved out of contact with contact 263 as shown in Figure 21. From Figure 25 it will be noted that if the contact 261 is moved out of contact with contact 263 clutch 17 will be cut out of the circuit with the battery and said clutch rendered inactive, while clutch 18 is still connected in the circuit. Should contact 261 be moved out of contact with the contact 262 clutch 18 will be cut out of the circuit with the battery while clutch 17 remains connected in the circuit. Therefore, if the cam is rotated to its limit in either direction one of the contact actuator heads 257 or 258 will be brought into engagement with the contact strip 261 and move said contact away from the contact through which the clutch then operating is connected in the circuit rendering said clutch inoperative until the conditions on the load receiving platform are remedied. The clutch operative to rotate the cam in the opposite direction is still connected in the circuit and as the load on the load receiver is brought within the capacity of the weighing mechanism when said clutch connected in the circuit is rendered inactive and operates to reverse the rotation of the cam, this movement of the cam moves contact actuator head out of engagement with the contact 261 and thereby restores the circuits for both clutches to their normal operating condition. For example, were a material carrying scoop or tray used regularly with the weighing mechanism and the weight 145 (Figure 2) adjusted so as to counterbalance said scoop or tray and bring the weighing mechanism into equilibrium, in which condition the weighing mechanism with no load thereon would register zero on the recording mechanism. Should the scop or tray be removed it would be evident that the weighing mechanism would move out of equilibrium and the counterpoise weight adjusting means would be set in operation to bring the weighing mechanism into equilibrium. This is undesirable and for this purpose the limit switch is provided to render the weighing mechanism inoperative just below the zero point, this being accomplished through the limit switch opening the circuit of the active clutch to render it inactive. Should the weighing mechanism be overloaded the same result would be accomplished except that the circuit for the opposite clutch would be opened and said clutch rendered inactive and would remain in such condition until the load is reduced when the companion clutch is rendered active to adjust the counterpoise weight and recording mechanism in the opposite direction.

As any suitable counter may be utilized as the recording means it has not been illustrated or described in detail, it only being necessary that the digits be suitably arranged upon the digit wheels.

To make a record of the weighing an impression is made from the digit wheels of the counter and for this purpose an ink ribbon 265 (Figure 1) is positioned over the wheels of the counter and the paper upon which the impression is to be made is placed above the ribbon. An impression making platen or hammer 266 is fixed to a shaft 267 rotatably mounted in bearings 268, 269. This shaft is actuated to move the platen into engagement with the paper and ribbon superposed to the printing wheels of the counter from the lever 63 carrying the justifying point 9 by means of a link 271 connected to said lever 63 and a crank 270 fixed to the shaft 267.

The operation of the weighing mechanism as described is substantially as follows: Assuming the weighing mechanism to be in equilibrium with no load upon the load receiver. As a load is placed upon the load receiver 136 the beam or weighing lever 146 is rocked to position the same in engagement with the stop 157ª. This movement of the weighing lever is transmitted to the friction wheel carrying frame 199 through the arm 198 connected to said frame and the weighing lever, thereby tilting said frame on the axis of the shaft 203 and changing the direction of travel of the friction wheel 16 relative to the direction of travel of the friction disk 15 and causing said wheel to take a higher position on said friction disk, this change in position of the friction wheel rocking the frame 204 about the axis of shaft 205 to depress the end of said frame carrying the rack 216 and through the meshing of said rack with the gear 217 rotating the shaft 218 to move the lever 221 fixed to said shaft to the right as viewed in Figures 4 and 5 thereby bringing the contact 229 carried by said lever into contact with the contact 230 and breaking contact between contacts 239, 243. This will establish the electric circuit as hereinbefore described to energize the clutch 17 coupling the shaft 24 thereto through the gears 20, 19 thereby operating the cam shaft 35 in a direction to position the cam 38 to lower the segment 166 and adjusting the counterpoise weights 162, 163 in a direction toward the end of the weighing lever 146, said shaft 24 also operating the recording mechanism to proportionally advance the same. This actuation of the mechanism will continue until the counterpoise weights are shifted relative to the beam 146 sufficiently to counterbalance the load and bring the weighing mechanism into equilibrium with the weighing lever in a position intermediate the stops 157ª, 158. This adjustment of the weighing mechanism will effect an adjustment of the friction wheel carrying frame 199 and frame 204 and thereby position the lever 221 in its position intermediate the contacts 230, 231 breaking contact between contacts 229 and 230 opening the circuit of the clutch 17 and de-energizing the clutch when the operation is completed and the weighing and recording mechanisms are brought to a stop. When the circuit is opened between contacts 229, 230 the circuit is again established between the contacts 239, 243 through the resiliency of the contact 234 thereby closing the circuit of magnet 79 and releasing the lever 55 (Figures 1, 19 and 20) permitting the same to move the contact actuator 94 carried thereby into engagement with contact 93 and move the latter into contact with the contact 92 thereby closing the circuit of and energizing magnet 69 which attracts the latch 68 thereto to release the justifying point carrying lever 63 when the justifying point 9 is moved into engagement with the star wheel 48 by the spring 66, and through the co-action of said point with the star wheel justifying the digit wheels of the counter of the recording mechanism when a printed record is made of the weight of the load from the platen 266. When the lever 63 is released the main circuit is opened through the moving of the blade contact 73 attached to said lever out of electrical connection with the post contacts 72 and thereby rendering the entire weighing mechanism inactive. As the load is removed from the load receiver the weighing lever or beam 146 is moved downward into engagement with the stop 158 which movement will be transmitted to the contact making lever 221 through the friction wheel carrying frame 199, 204, as hereinbefore described, the same, however, being moved in an opposite direction. This will cause the circuit to be established through contacts 229, 231 for the clutch 18 and rendering the same active thereby coupling the shaft 24 with the driving means through gears 21, 20 and 19 rotating said shaft in reverse direction and rotating the cam 38 in a direction to raise the segment 166 thereby shifting the counterpoise weights 162, 163 in a direction away from the end of the beam 146 until the latter is brought into equilibrium. The moving of lever 221 to bring the contacts 229, 231 into contact moved the contact 240 out of contact with contact 242 opening the circuit in which the magnet 79 is included. As the weighing lever is brought into equilibrium the lever 221 is also again moved to its central position with the contacts 229, 231 out of contact when the contacts 240, 242 are again brought into contact establishing the circuit in which magnet 79 is included and thereby effecting the actuation of the balance detector and justifying means for the recording mechanism.

Should the beam or weighing lever 146 be kept in a state of vibration through some external cause which would cause the indicated balance to be unreliable, a corresponding movement of the contact carrier 221 is effected but this movement of said lever would prevent contacts 240, 242 or 239, 243 from coming in contact and thereby closing the circuit in which the magnet 79 is included and the consequent actuation of the balance detector and justifying mechanism. Even though the circuit may be established for an instant through either one of said pair of contacts the contact actuating head 94 would require some time to be moved into engagement with the contact 93 and the latter moved into contact with the contact 92 to establish the circuit of the justifying means. However, before it could do so the balance detector contacts 92, 93 would again be out of contact when magnet 79 would be de-energized releasing the lever 81 thereby causing the contact actuating head 94 to be moved back to its position away from the contact 93 by the lever 81 through spring 85.

In Figures 26 to 37, inclusive, I have illustrated a modified construction and arrangement of my improved weighing and recording mechanism, some of the details of which are common to those shown in Figures 1 to 25, inclusive, and the same reference characters have been used to indicate corresponding parts in both arrangements. In this modified arrangement the frame 199 in which the friction wheel 16 is rotatably mounted is of bifurcated form and fixed to the end of shaft 203 journaled in the frame 204 which is of yoke shape and fixed to the shaft 205 rotatably supported in the brackets 206, the frame 199, 204 operating in a manner similar to that heerinbefore described. The arm 198' for connecting the tilting frame to the weighing lever is integral with the yoke frame 199 and carries a pivot supporting screw 197ª for a purpose to be hereinafter described. The frame 204 carries the rack 216 which is in the form of a sector which meshes with a pinion 272 fixed to the shaft 273 (Figure 28) rotatably mounted in standards 274, 275. A lever 276 has a contact strip 277 secured thereto, the lever being fixed to an insulator bushing 278 mounted and fixed upon shaft 273. A shaft 281 is rotatably mounted in standards 279, 280 in co-axial relation with the shaft 276 and to which shaft 281 is fixed a pinion 282 (Figure 27) and a lever 283 to which is fixed an insulator block having contact strips 285, 286 of resilient material mounted thereon with a rigid contact 287 in interposed relation to said latter contact strips. A pair of contact levers 288, 289 are loosely mounted upon and insulated from the shaft 281 by insulator bushings 290, 291 with the terminals of said levers arranged as collector rings extending or bent around the bushings. The insulator bushings are extended from the collector rings to form drums for the winding thereon of a few turns of cord 294, 295 having weights 296, 297 connected to and suspended from the ends thereof, these weights operating to maintain the contact strips in yielding engagement with the insulator strip 284 as shown in Figures 33 to 37, but out of contact with the contact 277. The weight 296 is connected to the hub of strip 288, and the weight 297 is connected to the strip 289. The gear 282 meshes with a toothed sector forming a part of a lever 298 pivotally supported on a shaft 301 mounted in standards 302, 303, the end of the lever opposite to the sector having a bifurcation in which is fixed a shaft 300 with a roller 299 loosely mounted thereon. The roller is in the nature of a cam follower to engage a cam 304 fixed to a shaft 305 rotating in standards 306, 307. A worm wheel 308 fixed to said shaft meshes with a worm 309 fixed to a shaft 310 rotatably mounted in standards 311, 312 and 313 with gears 314, 315 fixed to said shaft, the gear 314 meshing with the gear 47 of the justifying means, and the gear 315 meshing with the gear 21 rotatable with the armature disk 22 of clutch 18. The justifying mechanism and clutches are of the same construction as that illustrated in Figures 1 to 25 and hereinbefore described and reiteration thereof is not deemed necessary.

The apparatus is driven from a suitable source of power by a belt 316 passing around a pulley 317 fixed to a shaft 318 journaled in standards 320, 321 and 322. The justifying means is driven from said shaft by a gear 319 thereon meshing with a gear 324 on a shaft 323 journaled in bearings 325, 326 upon which the cam 5 for agitating the justfying point 9 is fixed. The clutches 17, 18 are also driven from shaft 318 through a gear 327 fixed to said shaft. The balance detector is driven from shaft 318 by a worm 328 fixed thereto meshing with worm wheel 54, the balance detector being substantially of the same construction and arrangement as hereinbefore described.

The friction driving surface for the friction wheel 16 is in the form of a concave disk 336 fixed to a spindle 337 journaled in a frame 338 fixed to the table 136 of the framework of the weighing mechanism, and is driven from shaft 318 through a bevel gear 329 fixed to said shaft meshing with a bevel gear 330 fixed to a shaft 331 journaled in bearings 334, 335, said latter shaft having a worm 332 fixed thereto meshing with a worm wheel 333 fixed to the concave disk carrying shaft 337. The mechanism is attached to a scale beam 339 of weighing mechanism instead of to the weighing lever or beam by means of a frame 341 loosely suspended from the scale beam by a hook 340. A pendulum 347 in the form of a segment carries a weight 348 by adjustably mounting the same upon a rod or arm 349 fixed in and extending laterally from the curved face of the segment, the pendulum segment being fixed to a shaft 351 rotatably mounted in standards 350 rigidly fixed to a base 352. The pendulum counterpoise weight carrying segment 347 is connected to the frame 341 by a flexible strap 345 secured by a clip 353 to the segment and by a clip 346 with said frame. It will be noted that the pendulum segment is hung directly from the beam 339 and any movement of the beam will effect a corresponding movement in the pendulum segment.

To operatively connect the carrying frame 199 for the friction wheel 16 to the controlling means of the actuating means for the recording mechanism a pivot screw 197ᵃ is mounted in the right angle extension 198′ of the frame 199 the pointed end of which pivot screw is engaged in a seat in a leg of a yoke link 343 suspended from the frame 341 by a pin 342 fixed in and extending upward from a lateral extension of said frame engaging in a seat in the other leg of the yoke link 343.

The use of the concave disk is desirable in some instances since the flat face friction disk 15 can only be used where the movement of the frame 204 about the axis of shaft 205 is confined to a very narrow limit of travel across the face of the disk, which in practice is about five hundredths of an inch, whereas the concave disk whose inner surface is in an arc of a circle the center of the radius of which is in the center of the shaft 205 may be rotated to a much greater extent without disturbing the relation of the other elements. Therefore, the range of movement of the sector rack may be much greater than the movement of the straight rack shown in Figure 4, thus permitting of a greater movement of the contact carrying lever 221, 276 which controls the opening and closing of the circuits in which the electromagnetic clutches are included. The contact strips 285, 286 as shown in Figures 29, 30 are fixed upon the insulating blocks 284 and are so arranged and tensioned that they are normally spread and out of contact with the contact 287 unless means are provided to exert an external force on said contact strips to move and maintain them in contact with the contact 287 in which condition they close the circuit of the balance detector.

The operation of the modified apparatus shown in Figures 26 to 33, inclusive, is substantially as follows: Assuming the scale beam 339 is in equilibrium with no load upon the load receiver connected to said beam. As a load is placed upon the load receiver the beam is caused to move upward, this upward movement being controlled by the counterpoise weight carrying pendulum 347. This upward movement of the beam is transmitted to the frame 199 carrying friction wheel 16 through the yoke link 343 changing the direction of travel of said wheel relative to the face of the concave disk effecting a rocking of the frame 204 about the axis or shaft 205 and the rotation of the pinion 272 and its supporting shaft 273 through the sector rack rocking the lever 276 and contact strip 277, the contact arm 288 being free to move independently of the shaft 281 is carried by said lever 276 (Figure 36) establishing electrical connection between them, the weight 296 maintaining this electrical connection, and this movement of the arm 288 moving contact 286 out of contact with contact 287. In this condition of the parts the electric current will flow from battery 354 through conductor 355, switch 253, conductor 356, branch 357, arm 276, contact strip 277, contact arm 288 to the collector ring 292, thence through strip 360, conductor 358 to the clutch 18, thence through conductor 359 back to the battery and thus energizing clutch 18 and rotating gear 21. This rotation of the gear 21 effects a rotation of the cam 304 in a direction which will cause roller 299 to move downward rocking the lever 298, the toothed sector of said lever rotating pinion 282 and shaft 281 in a direction to cause lever 283 to follow the rotation of the lever 276. When the lever 283 has been rotated an extent to bring the insulator block 284 into engagement with the strip 288 said strip will be moved out of contact with contact 277 opening the circuit and thereby de-energizing the clutch and bringing the operation to a stop when the parts are returned to the position shown in Figure 35. The weights 296, 297 maintain the strips 288, 289 in engagement with the insulator block 284 at all times unless one or the other is moved away by the movement of the strip 277 with the arm 276. The circuit of the balance detector is now closed and current will flow through conductors 355, 356 as described through strip 286, contact 287, strip 285 and thence through conductor 362 of the magnet 79, thence through branch conductor 363 to conductor 359 and back to the battery thus setting the balance detector into operation, which in turn closes the circuit for the magnet 69 to actuate the means to release the justifying point 9 and permit it to move into engagement with the star wheel 48 of the recording mechanism.

Should the load be removed from the scale beam and the beam moved to underload position the lever 276 will be moved in a direction opposite to that shown in Figure 36 moving contact 277 into contact with the strip 289 and moving the latter away from the insulator block 284 thereby closing the circuit for and energizing the magnet 17 to rotate the parts in reverse direction, and the cam 304 in a direction to permit the roller 299 to move upward and through the meshing of the segment teeth of the lever 298 with the pinion 282 causing the lever 283 carrying the insulator block 284 to follow the movement of lever 276, this movement of the lever 283 being followed up by the movement of the contact strip 288 through the action of the weight 296, and when the insulator block 284 engages the contact strip 289 move the contact 285 out of contact with the contact 287 when the parts are returned to initial position as hereinbefore described.

The counter of the recording mechanism is driven from the shaft 310 and so arranged that an impression may be made therefrom by the platen 266 mounted on the shaft 267.

Having thus described my invention I claim:

1. In automatic weighing apparatus, a weighing beam arranged with load receiving means, power operated means to return said beam to a balance when the beam is moved out of equilibrium, including a traveling member having a friction surface, a friction wheel to engage the friction surface of said member and driven thereby, a carrier for said wheel having a connection with the beam, and normally maintained in position when the beam is in equilibrium with the friction wheel traveling in the same plane as the friction member and adapted to be moved by the beam when the latter is moved out of equilibrium to change the plane of travel thereof in angular relation to the plane of travel of the friction member, co-related load balancing means having a connection with the beam, means for adjusting the load balancing means, and normally inactive clutch mechanism to connect the load balancing adjusting means with the power operated means to be rotated thereby rendered active by means operative through movement of the friction wheel carrier imparted thereto by the wheel in a direction transverse to the movement imparted thereto by the beam.

2. In automatic weighing mechanism, a weighing beam, power operated means for returning said beam to a balance whenever the equilibrium thereof is disturbed by a load connected thereto, including a traveling member having a friction surface, a friction wheel to frictionally engage the friction surface of said traveling member and driven thereby, a carrier frame for said wheel pivotally supported to have movement on an axis transverse to the axis of the wheel and having operative connection with the beam whereby when the beam is moved out of equilibrium participating movement is imparted to the wheel carrier about its pivotal support, pivotally supported counterpoise weight carrying means having connection with the beam, a rotatable cam operative to impart movement to said means, means to rotate the cam from the power means normally disconnected from the latter, weight recording means operative from the cam rotating means in synchronism with the cam, means set in operation when the carrier for the friction wheel is moved on the pivotal support to connect the cam rotating means with the power means, and means operative when the beam is brought to a position of equilibrium for justifying the weight recording means.

3. In automatic weighing apparatus, a balanced weighing beam, power means, a traveling member having a friction surface driven from said power means, a wheel to have frictional contact with and driven by the friction surface of said member, a frame in which the wheel is rotatably supported and to have adjustment on an axis transverse of its axis of rotation and the frame pivotally mounted to have movement on an axis transverse to the axis of the wheel support, a connection between the wheel supporting frame and beam to maintain the wheel in position to travel in the same plane as the friction member when the beam is in equilibrium, and the frame adapted to participate in the movement of the beam to change the direction of travel of the wheel in angular relation to the direction of travel of the friction member, and said wheel by a change in direction of travel thereof imparting movement to the frame upon its pivotal support, adjustable counterpoise weight having connection with the beam, means for adjusting said counterpoise weight when the beam is moved out of balance to bring the beam into balance, and a pair of electrically operated clutches to couple said counterpoise weight adjusting means with the power means for adjusting the counterpoise weight to restore the beam to balance when moved out of equilibrium, said clutches being connected in normally open electric circuits and rendered active by the closing of the circuits, and circuit closing means operative by the movement of the wheel carrying frame effected by the movement of the wheel when the weighing beam is moved out of equilibrium.

4. In automatic weighing apparatus as claimed in claim 3, weight recording means operatively connected to the actuating means for the counterpoise weight adjusting means to be actuated in synchronism therewith.

5. Automatic weighing apparatus as claimed in claim 3, wherein the circuit closing means for the clutches comprises a series of electric switches thrown into and out of contact by the movement of the wheel carrying frame effected by changes in the direction of travel of the wheel in angular relation to the direction of travel of its co-operating driving friction member as the beam is moved out of and into equilibrium.

6. Weighing mechanism as claimed in claim 3, wherein the weight recording means comprises a counter, and means to make an impression from the digit wheels of said counter to make a record of the weight of a load.

7. Weighing mechanism as claimed in claim 3, wherein the weight recording means comprises a counter, means to justify the digit wheels of the counter, means to make an impression from the justified digit wheels of said counter to make a record of the weight of a load, and means for opening the circuit of the clutches when the justifying means is actuated.

8. Weighing mechanism as claimed in claim 3, wherein the weight recording means comprises a counter, means to make an impression from the digit wheels of said counter to make a record of the weight of the load, and electromagnetic means for actuating said impression making means connected in an open electric circuit when the circuits of the clutches for adjusting the counterpoise weight actuating cam and counter are closed and adapted to be closed to energize said electromagnets when the circuits of the clutches are opened.

9. In automatic weighing mechanism as claimed in claim 3, means for rendering the weighing apparatus inactive when the weighing beam is moved beyond predetermined limits to overload or underload position.

10. Weighing mechanism as claimed in claim 3, wherein the weight recording means comprises a counter, means to make an impression from the digit wheels of said counter to make a record of the weight of the load, electromagnetic means for actuating said impression making means connected in an open electric circuit when the circuits of the clutches for adjusting the counterpoise weight actuating cam and counter are closed and adapted to be closed to energize said electromagnets when the circuits of the clutches are opened, and means to regulate the interval of the actuation of the impression making means after the beam has been brought to balance and the clutches rendered inactive.

11. Weighing mechanism as claimed in claim 3, wherein the weight recording means comprises a counter, means to make an impression from the digit wheels of said counter to make a record of the weight of the load, electromagnetic means for actuating said impression making means connected in an open electric circuit when the circuits of the clutches for adjusting the counterpoise weight actuating cam and counter are closed and adapted to be closed to energize said electromagnets when the circuits of the clutches are opened, means to regulate the interval of the actuation of the impression making means after the beam has been brought to balance and the clutches rendered inactive, and means operative coincident with the actuation of the impression making means for justifying the recording means.

12. In automatic weighing apparatus, a weighing beam, adjustable counterpoise weight connected to and normally counterbalancing the beam, a continuously travelling member having a friction surface, a friction wheel driven from the friction surface of said member, a frame in which the friction wheel is rotatably mounted adapted to be tilted about an axis transverse to the axis of rotation of the wheel and on an axis parallel with the axis of the wheel, a connection between said friction wheel carrying frame and the beam arranged when the beam is in equilibrium to position the wheel to travel in the same plane as the direction of travel of the friction member and the direction of travel of said wheel adapted to be changed in angular relation to the direction of travel of the friction member through said connection by and in accordance with the movement of the beam out of and into equilibrium, counterpoise weight adjusting means, driving means therefor normally disconnected therefrom, and means operative from the movement of the tilting frame imparted thereto through the changes in the direction of travel of the friction wheel effected by the movement of the beam out of equilibrium to operatively connect said counterpoise weight adjusting means with the driving means and bring the beam into equilibrium.

13. Automatic weighing apparatus as claimed in claim 12, wherein the means to operatively connect the counterpoise weight adjusting means with the driving means comprises electromagnetically operated clutch mechanism.

14. Automatic weighing apparatus as claimed in claim 12, wherein the counterpoise weight adjusting means is operatively connected with the driving means by a pair of electromagnetically operated clutches, one clutch being operative to connect said means to the driving means to adjust the counterpoise weight in one direction and the other clutch being operative to connect the driving means to adjust the counterpoise weight in the opposite direction.

15. Automatic weighing apparatus as claimed in claim 12, wherein the counterpoise weight adjusting means is operatively connected with the driving means by a pair of electromagnetically operated clutches, one clutch being operative to connect said means to the driving means to adjust the counterpoise weight in one direction and the other clutch being operative to connect the driving means to adjust the counterpoise weight in the opposite direction, and the counterpoise weight comprising a pivotally supported weighted lever having connection with the beam at the pivotal support, a second lever connected to the first lever, and a cam to adjust the second lever and thereby the weight carrying lever.

16. Automatic weighing apparatus as claimed in claim 12, wherein the counterpoise weight adjusting means is operatively connected with the driving means by a pair of electromagnetically operated clutches, one member of each clutch having a driving connection with the driving means and the other member of one clutch having a driving connection with the counterpoise weight adjusting means arranged to adjust the counterpoise weight in one direction when the beam is moved to overload position, and the other member of the other clutch having a driving connection with the counterpoise adjusting means arranged to adjust the same in the opposite direction when the beam is moved to underload position.

17. In automatic weighing apparatus, a weighing beam, a pivotally supported counterpoise weight carrying lever having a connection at the pivotal support thereof with the beam, a second lever connected to the first lever, means to adjust said second lever and thereby the counterpoise weight carrying lever, a counter connected with the means to adjust the counterpoise weight carrying lever to be operative in synchronism therewith, driving means for said counterpoise weight adjusting means and counter, and clutch mechanism operative from the beam when moved out of equilibrium by a load applied thereto to adjust the counterpoise weight carrying lever to bring the beam into equilibrium and actuate the counter, and to adjust said counterpoise weight carrying lever to bring the beam into equilibrium when the load is removed therefrom.

18. In automatic weighing apparatus as claimed in claim 17, means operative when the beam is brought into equilibrium to counterbalance a load applied thereto to make a record of the weight of the load from the counter.

19. In automatic weighing apparatus as claimed in claim 17, means for justifying the counter when the beam is brought into equilibrium, and means operative to make a record of the weight of the load from the counter after the same has been justified.

20. In automatic weighing apparatus as claimed in claim 17, means for justifying the counter when the beam is brought into equilibrium to counterbalance a load applied thereto, comprising a star wheel operatively connected to the primary mover of the counter, a pivoted lever movable toward and away from the star wheel, and a nose pivotally carried by the lever to have vibratory movement to co-operate with the star wheel, and means operative to make a record of the weight of the load from the counter after the same has been justified.

21. In weighing mechanism, adjustable counterpoise means to bring the weighing mechanism into balance when moved out of equilibrium, a member having a friction surface travelling constantly in a fixed plane, a friction disk driven by the friction surface of said member, a connection between said disk and the weighing mechanism operative to maintain the disk in position to travel in the same plane as the friction member with the weighing mechanism in equilibrium and through which connection the direction of travel of the disk is adapted to be changed in angular relation to the direction of travel of the friction member when the weighing mechanism is moved out of equilibrium, means operative to adjust said counterpoise when the weighing mechanism is moved out of equilibrium to move the weighing mechanism into balance, driving means for said adjusting means, clutch mechanism to couple the driving means to the counterpoise adjusting means, said clutch mechanism being inactive when the weighing mechanism is in equilibrium, and means operative by the disk when moved to travel in angular relation to the friction surface of said travelling member by the moving of the weighing mechanism out of equilibrium to render said clutch mechanism active to couple the driving means with the counterpoise adjusting means.

22. Weighing mechanism as claimed in claim 21, wherein the clutch mechanism comprises electromagnetically operated clutch mechanism connected in a normally open electric circuit, and circuit closing means operative through the movement of the disk when moved to travel in angular relation to the friction surface of the traveling member by the moving of the weighing mechanism out of equilibrium to render the clutch mechanism active to couple the driving means with the counterpoise adjusting means and to open said circuit when the weighing mechanism is brought to balance.

23. Weighing mechanism as claimed in claim 21, wherein the clutch mechanism comprises a pair of clutches, one of which clutches is rendered active to couple the driving means to the counterpoise adjusting means by means operative through the disk when the direction of travel of the disk is changed in angular relation to the direction of travel of the friction member by the movement of the weighing mechanism out of equilibrium by applying a load thereto to apply the counterpoise to the weighing mechanism to counterbalance the load, and the other clutch rendered active through the disk by the movement of the weighing mechanism out of equilibrium by removal of the load therefrom to couple the driving means to the counterpoise adjusting means and relieve the weighing mechanism of the counterpoise to bring the weighing mechanism into balance.

24. Weighing mechanism as claimed in claim 21, wherein the clutch mechanism comprises a pair of electromagnetically operated clutches connected in a normally open electric circuit, and circuit closing mechanism operative through the disk when the direction of travel of the disk is changed in angular relation to the direction of travel of the friction member by the movement of the weighing mechanism out of equilibrium by applying a load thereto to connect one of the clutches in the circuit to render the same active to couple the driving means to the counterpoise adjusting means to adjust the counterpoise to counterbalance the load, and to connect the other clutch in the circuit to render the same active by the movement of the weighing mechanism out of equilibrium by the removal of the load therefrom to couple the driving means to the counterpoise adjusting means and relieve the weighing mechanism of the counterpoise and bring the same into balance and to cut both clutches out of the circuit and render the same inactive when the beam is in equilibrium.

25. In automatic weighing mechanism, a weighing beam, adjustable counterpoise weight connected to the beam, means to adjust said counterpoise weight to apply the same to or remove it from the beam, power means, a traveling member having a friction surface, a wheel to frictionally contact with and be driven by the friction surface of said traveling member, a connection between said wheel and beam whereby the wheel with the beam in equilibrium is positioned to travel in the direction of travel of the friction member and when the beam is moved to overload or underload position to adjust said wheel to travel in angular direction to the direction of travel of the friction member, a clutch rendered active through a change in the direction of travel of the wheel effected by the beam when moved to overload position to couple the counterpoise weight adjusting means to the power means to apply said counterpoise weight to the beam, and a second clutch rendered active through another change in direction of travel of the wheel effected by the beam when moved to underload position to couple the counterpoise weight adjusting means to the power means to remove said counterpoise weight from the beam, and said clutches rendered active by the positioning of the wheel to travel in the plane of travel of the friction member when the beam is brought into equilibrium.

26. In automatic weighing mechanism, a weighing beam, adjustable counterpoise weight connected to the beam, means to adjust said counterpoise weight to bring the beam into balance when moved out of equilibrium, power means, traveling members having contacting friction surfaces one of which is connected to the beam and the direction of travel thereof adapted to be changed in angular relation to the direction of travel of the friction surface of the other member by the movement of the beam to overload or underload position, and means operative through the movement of the friction surface of the one member by a change in the direction of travel thereof effected by the beam to couple the counterpoise weight adjusting means to the power means to adjust the counterpoise weight and bring the beam into equilibrium.

27. In automatic weighing mechanism, a weighing beam, adjustable counterpoise weight connected to the beam, means to adjust said counterpoise weight to bring the beam into balance when moved out of equilibrium, power means, electrically operated clutch mechanism connected in normally open circuit with a source of electricity to couple the counterpoise weight adjusting means with the power means, traveling members having contacting friction surfaces one of which is connected to the beam and the direction of travel thereof adapted to be changed in angular relation to the direction of travel of the other member by the movement of the beam to overload or underload position, and means to connect the clutch mechanism in circuit with the source of electricity by a change in the direction of travel of the one friction member effected by the movement of the beam out of equilibrium to render the clutch mechanism active and couple the counterpoise weight adjusting means with the power means.

Signed at Passaic, N. J., in the county of Passaic and State of New Jersey, this 16th day of March, 1926.

FRANK S. HEBDEN.